United States Patent
Wohlgemuth et al.

(10) Patent No.: US 7,640,300 B2
(45) Date of Patent: *Dec. 29, 2009

(54) PRESENCE AND NOTIFICATION SYSTEM FOR MAINTAINING AND COMMUNICATING INFORMATION

(75) Inventors: Sean Christian Wohlgemuth, Marysville, WA (US); Mark D. VanAntwerp, Redmond, WA (US); Boyd C. Multerer, Seattle, WA (US); Brian R. Morin, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 780 days.

This patent is subject to a terminal disclaimer.

(21) Appl. No.: 10/167,992

(22) Filed: Jun. 10, 2002

(65) Prior Publication Data

US 2003/0233537 A1 Dec. 18, 2003

(51) Int. Cl.
*G06F 15/16* (2006.01)
(52) U.S. Cl. .................. 709/204; 713/151; 713/152; 713/182; 709/203; 709/205; 709/206; 709/223; 463/36; 463/42; 455/416
(58) Field of Classification Search .............. 713/151, 713/152, 182; 463/42, 25, 43; 709/207, 709/223, 203, 205; 455/416, 418; 380/278
See application file for complete search history.

(56) References Cited

U.S. PATENT DOCUMENTS 5,935,211 A   8/1999  Osterman
6,021,119 A * 2/2000  Derks et al. ............... 370/261
6,142,872 A * 11/2000 Walker et al. ................ 463/16
6,166,732 A   12/2000 Mitchell et al.
6,175,876 B1  1/2001  Branson et al.

(Continued)

FOREIGN PATENT DOCUMENTS

EP         0 798 899 A        10/1997

(Continued)

OTHER PUBLICATIONS

Russell Bennett et al, Integrating Presence with Multi-Media Communications, White Paper, pp. 1-19, dynamicsoft Inc. 2000.*

(Continued)

*Primary Examiner*—Nasser G Moazzami
*Assistant Examiner*—Shanto M Abedin
(74) *Attorney, Agent, or Firm*—Lee & Hayes, PLLC

(57) ABSTRACT

In accordance with one aspect, a client device is sent an indication of one or more types of information available for the client device. In response to the indication, a request is received from the client device to retrieve the information available for the client device. The information is identified and sent to the client device. In accordance with another aspect, one or more friends of the user are identified from persistent data, and a check made as to whether each of them is logged in to the system. For each of them that is logged in to the system, the user is subscribed to the friend's information and the friend is subscribed to the user's information. In accordance with another aspect, a user is allowed to be a friend of another user only if the other user is also a friend of the user.

19 Claims, 9 Drawing Sheets

U.S. PATENT DOCUMENTS

| | | | |
|---|---|---|---|
| 6,195,685 B1 | 2/2001 | Mukherjee et al. | |
| 6,468,160 B2 | 10/2002 | Eliott | |
| 6,503,146 B2* | 1/2003 | Walker et al. | 463/25 |
| 6,652,378 B2* | 11/2003 | Cannon et al. | 463/20 |
| 6,681,108 B1* | 1/2004 | Terry et al. | 455/412.2 |
| 6,692,359 B1* | 2/2004 | Williams et al. | 463/42 |
| 6,699,125 B2* | 3/2004 | Kirmse et al. | 463/42 |
| 6,712,704 B2 | 3/2004 | Eliott | |
| 6,769,989 B2 | 8/2004 | Smith et al. | |
| 6,805,634 B1* | 10/2004 | Wells et al. | 463/42 |
| 6,807,562 B1* | 10/2004 | Pennock et al. | 709/204 |
| 6,905,414 B2* | 6/2005 | Danieli et al. | 463/42 |
| 6,915,331 B2* | 7/2005 | Fuller et al. | 709/204 |
| 7,024,459 B2* | 4/2006 | McNamara et al. | 709/206 |
| 7,056,217 B1* | 6/2006 | Pelkey et al. | 463/43 |
| 7,080,139 B1* | 7/2006 | Briggs et al. | 709/224 |
| 7,188,140 B1* | 3/2007 | Greenspan et al. | 709/204 |
| 7,240,093 B1* | 7/2007 | Danieli et al. | 709/205 |
| 2001/0034224 A1 | 10/2001 | McDowell et al. | |
| 2001/0051528 A1 | 12/2001 | Lielbriedis | |
| 2001/0053214 A1 | 12/2001 | Kleinoder et al. | |
| 2002/0065097 A1* | 5/2002 | Brockenbrough et al. | 455/552 |
| 2002/0076025 A1* | 6/2002 | Liversidge et al. | 379/202.01 |
| 2002/0086732 A1* | 7/2002 | Kirmse et al. | 463/42 |
| 2002/0094870 A1* | 7/2002 | Murray | 463/42 |
| 2002/0103029 A1* | 8/2002 | Finlayson et al. | 463/42 |
| 2003/0014487 A1* | 1/2003 | Iwakawa et al. | 709/204 |
| 2003/0125112 A1* | 7/2003 | Silvester | 463/42 |
| 2004/0162137 A1 | 8/2004 | Eliott | |

FOREIGN PATENT DOCUMENTS

| | | |
|---|---|---|
| JP | 2001313723 A | 11/2001 |
| JP | 2002074164 A | 3/2002 |
| WO | WO 99/34628 | 7/1999 |

OTHER PUBLICATIONS

"Document presence notification services for collaborative writing", Moran et al., Proceedings Seventh International Workshop on Groupware, Sep. 6-8, 2001, pp. 125-133.

"Towards an open protocol for secure online presence notification", Fong et al., Computer Standards & Interfaces, Sep. 2001, vol. 23, No. 4, pp. 311-324.

"Providing presence cues to telephone users", Milewski et al., Proceedings of CSCW 2000, ACM Conference on Computer Supported Cooperative Work, Dec. 2-6, 2000, pp. 89-96.

"Online and multiplayer gaming—An Overview", Cox, T., Virtual Reality (UK), Computer Games and Interactive Entertainment, Oct. 25, 2000, vol. 5, No. 4, pp. 215-222.

"Microsoft Unveils a More User-Friendly MSN Gaming Zone", Microsoft PressPass, Aug. 31, 1999, 2 pgs.

"Microsoft Boosts Accessibility to Internet Gaming Zone with Latest Release", Microsoft PressPass, Apr. 27, 1998, 2 pgs.

Rosenberg, J. et al., "SIP For Presence", On Line, Nov. 13, 1998, 18 pages.

Ebitani, Satoshi "The Key Points to Learn—The Positive Effects of Instant Messages in an Enterprise", Nikkei Communications, No. 353, Nikkei Business Publications, Inc., Nov. 5, 2001, pp. 106-113.

Makida, Toshiharu, "The New Communication System: Chocoa Communicator", Fujitsu, vol. 52, No. 1, Fujitsu Limited, Jan. 10, 2001, pp. 74-79.

Nihei, Akira "The Secret of an XP-Based Always-Connected Application", ASCII, vol. 25, No. 12, ASCII Corporation, Dec. 1, 2001, pp. 196-199.

Notice of Rejection for Japanese Patent Application No. 2003-165713 mailed on May 22, 2009, 11 pgs.

* cited by examiner

PRESENCE AND NOTIFICATION SYSTEM FOR MAINTAINING AND COMMUNICATING INFORMATION

TECHNICAL FIELD

This invention relates to computer and online systems, and particularly to a presence and notification system for maintaining and communicating information.

BACKGROUND

Using current computing devices, it is frequently desirable for the users of these devices to communicate with one another. For example, users may desire to send short communications or messages to one another when both are logged in to the Internet. The users may use these messages to communicate any of a variety of information, such as details about their day, questions about homework, details ii about boyfriends/girlfriends, information regarding computer games, just to chat, etc.

In order for such online messaging to occur, information regarding the users is typically maintained, such as whether a particular user is logged in to the Internet or not (allowing messages to be sent only to users logged in to the network). One problem presented with maintaining such information (e.g., whether the user is logged in) is how to get the information to the appropriate users. One solution is to keep a TCP/IP (Transmission Control Protocol/Internet Protocol) connection open between each of the user's devices and the server(s). However, such constant TCP/IP connections require a significant amount of overhead, thereby increasing the number of central servers that must be used. Another solution is to have each client device repeatedly query the central server(s) for any new information. However, such continual querying results in a significant number of requests and responses for which there is no new information (e.g., the user is still logged in, so an indication that the user is no longer logged in need not be sent).

The presence and notification system for maintaining and communicating information described below solves these and other problems.

SUMMARY

Presence and notification system for maintaining and communicating information is described herein.

In accordance with certain embodiments of the system, a client device is sent an indication of one or more of a plurality of types of information available for the client device. In response to the indication, a request is received from the client device to retrieve the information available for the client device. The information available for the client device is identified and sent to the client device.

In accordance with certain embodiments of the system, when a user logs in to the system persistent data for the user is loaded from a profile store. One or more friends of the user are identified from the persistent data, and a check made as to whether each of the one or more friends is logged in to the system. For each of the one or more friends that is logged in to the system, the user is subscribed to the friend's information and the friend is subscribed to the user's information.

In accordance with certain embodiments of the system, a list of friends is maintained for a user of a remote game console. The user is allowed to be a friend of another user only if the other user is also a friend of the user.

BRIEF DESCRIPTION OF THE DRAWINGS

The same numbers are used throughout the document to reference like components and/or features.

DETAILED DESCRIPTION

The following discussion is directed to a presence and notification system for online services. The discussion assumes that the reader is familiar with basic cryptography principles, such as encryption, decryption, authentication, hashing, and digital signatures. For a basic introduction to cryptography, the reader is directed to a text written by Bruce Schneier and entitled, "Applied Cryptography: Protocols, Algorithms, and Source Code in C," published by John Wiley & Sons, copyright 1994 (second edition 1996), which is hereby incorporated by reference.

Discussions herein refer to "friends". A friend of a particular user refers to another user whose information is subscribed to by the particular user when the other user is logged in. By subscribing to information of the other user, the particular user is able to receive indications of changes to that information (e.g., the particular user can be notified when the other user changes from playing a game to pausing the game). A friend may also be referred to as a buddy.

Figure 1:
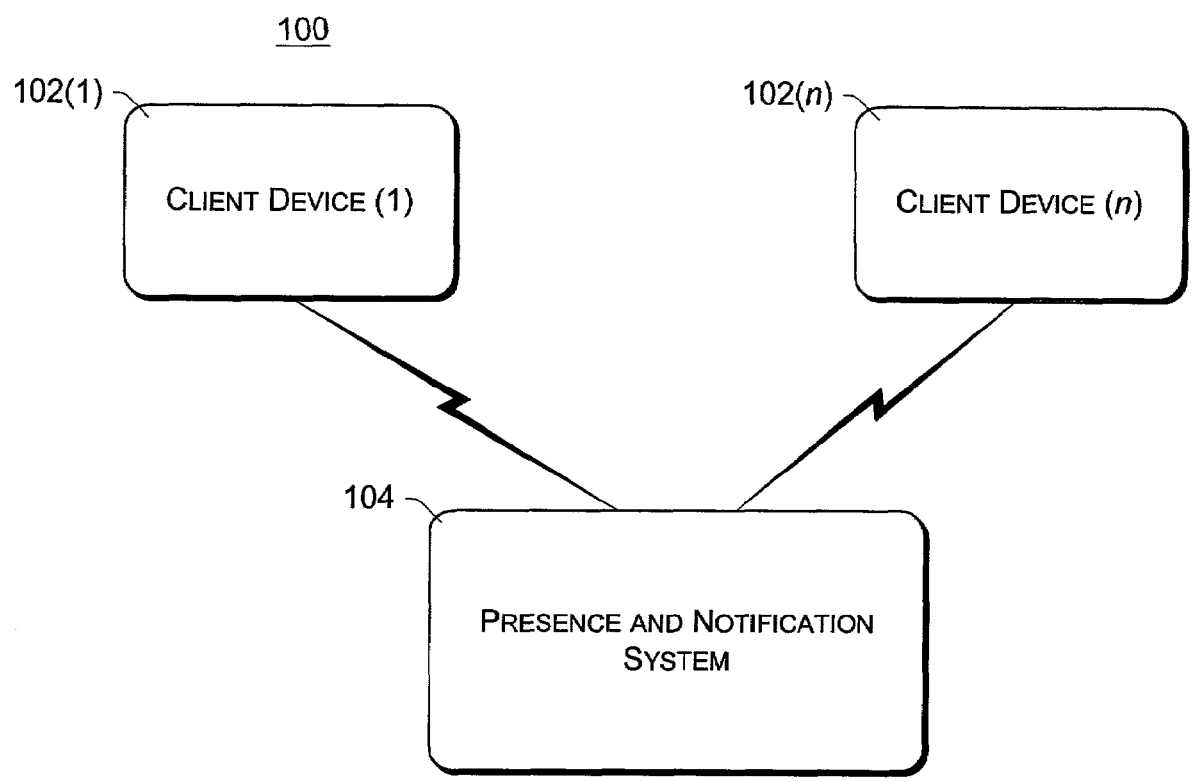
FIG. 1 is a block diagram of an exemplary environment.

FIG. 1 is a block diagram of an exemplary environment 100. Multiple client devices 102(1), ..., 102(n) are coupled to a presence and notification system 104. The coupling between devices 102 and system 104 can be any of a variety of couplings allowing communication between system 104 and each of devices 102. In one implementation, the coupling includes the Internet, and may also optionally include one or more other networks (e.g., a local area network (LAN) or wide area network (WAN)).

Presence and notification system 104 maintains information (also referred to herein as data) regarding users logged in to system 104, as well as which users are subscribed to which other user's information. A client device 102 being used by a user that is subscribed to another user's information receives a notification when new information regarding the other user is available from system 104. Presence and notification system 104 allows for intelligent polling of system 104 by client devices 102, thereby alleviating each client device 102 (as well as system 104) from the burden of repeated polling of system 104 when no information is available for the device at system 104.

Any of a wide variety of types of information regarding users may be maintained by system 104. Examples of such information types include: a current status of a user, information regarding the game title being played by the user, information regarding the user's hardware or console configuration, security information, and so forth. System 104 can concurrently maintain multiple different information types for a particular user. Whenever any of the maintained information for a user changes, any other user that has subscribed to that user's information is notified of the change (when the user's client device 102 retrieves the information, as discussed in more detail below).

In order to notify a user of a change in another user's information, an indication is sent from system 104 to the user's client device 102 (the client device being used by the user and via which the user logged in to system 104). This indication is also referred to as a "tickle". This indication notifies the client 102 that information is available at system 104 for retrieval, and optionally informs client 102 the type(s) of information that are available. The client 102 can then poll system 104 for the information that system 104 has for client 102. This polling is thus done intelligently, as client 102 need only poll system 104 when client 102 knows that system 104 has information for it. Once received, the client 102 can make the information available to the user in any of a variety of manners (e.g., display an icon representing the information, display the information in a dialog or text box on a display device of the client, save the information until specifically requested by the user, etc.).

It is up to the client 102 to determine when it wants to poll system 104 in response to the indication. Depending on other operations being performed by client 102 at the time and/or optionally on the type of information indicated as being available, client 102 may desire to wait an amount of time prior to polling system 104. Additionally, it is up to the client 102 to determine when it wants to display information retrieved from system 104 to the user. Again, depending on other operations being performed by client 102 at the time and/or on the type of information retrieved, client 102 may desire to wait to display the information to the user.

The indication or tickle sent by system 104 to client 102 is included in (also referred to as being piggybacked on) another message being sent to client 102 for another purpose. In one exemplary implementation, system 104 sends a heartbeat message to client 102 at regular or irregular intervals. The heartbeat message may serve multiple purposes, such as to inform client 102 that system 104 is still functioning, to keep a routing through an intermediary device (e.g., a router performing Network Address Translation (NAT)) active, etc. The indication sent to client 102 can be included in this heartbeat message. Thus, the indication is piggybacked onto another communication, alleviating the need for system 104 to send a separate message to client 102 to inform it of the information that is available.

The indication sent to client 102 can take any of a variety of different forms. In one implementation, the indication is a set of one or more flags, each indicating whether a particular type of information is currently available for the client. Alternatively, another value may be generated to encode the various types (e.g., a 3-bit value may be used to encode eight ($2^3$) different types). Alternatively, a separate indication may be sent (optionally piggybacked on different messages) for each type of information that is currently available.

In an exemplary implementation, after sending an indication to client 102, system 104 re-sends the indication after an interval of time if client 102 has not yet polled system 104 for the information. The manner in which communications are sent from system 104 to client 102 may not guarantee delivery of messages to client 102. For example, messages may be sent using the UDP (User Datagram Protocol) format, which does not guarantee that a message being sent will actually be delivered to the recipient. Thus, system 104 re-sends an indication to client 102 due to the possibility that the previous indication(s) may not have been delivered to client 102. This re-sending continues until either the client 102 has polled system 104 for the information, or alternatively until a threshold number of indications have been sent. System 104 also optionally implements a back off mechanism to reduce the frequency with which indications are re-sent. Typically, the more indications that are re-sent to the client, the greater the probability that at least one of the indications has been delivered to the client but that the client is not polling system 104 for some other reason (e.g., the client may be busy performing other operations). For example, an indication may be re-sent after 20 seconds, and then again after another 40 seconds, and then again after another 80 seconds, and then again after another 160 seconds, etc.

In presence and notification system 104, subscriptions are mutual. In other words, when user A subscribes to receive user B's information, then user B also subscribes to receive user A's information. When subscriptions are mutual, system 104 does not allow a user to subscribe to another user's information without the other user also being subscribed to the user's information. In alternate implementations, subscriptions are not mutual.

Presence and notification system 104 maintains information about the status of users when they are logged in to system 104. References herein to the user logging in to system 104 or being logged in to system 104 refer to the user logging in directly to system 104, or alternatively to the user logging in to some other device that manages logging in to system 104 on behalf of system 104, or manages logging in to a larger system that presence and notification system 104 is part of. This logging in can be performed in any of a wide variety of manners, and in one exemplary implementation is performed by having system 104 (or another device acting on behalf of system 104 and optionally other systems as well) authenticate the user (e.g., based on an id and/or password) and the user's device 102 (e.g., based on a device id), and establish a secure communications channel between the user's device 102 and system 104.

In some of the discussions herein, client device 102 is referred to as a game console. Client device 102 may be a dedicated game console, or alternatively may include additional functionality. For example, the game console may include digital video recording functionality so that it can operate as a digital VCR, the game console may include channel tuning functionality so that it can tune and decode television signals (whether they be broadcast signals, cable signals, satellite signals, etc.), and so forth. Client device 102 may also be other types of computing devices, such as a desktop PC, a portable computer, a cellular telephone, an Internet appliance, a server computer, etc. Additionally, different types of devices 102 may use presence and notification system 104 concurrently. For example, a user on a dedicated game console may subscribe to information of a user on a portable computer, or a user on a dedicated game console manufactured by one manufacturer may subscribe to information of a user on a dedicated game console manufactured by another manufacturer.

Figure 2:
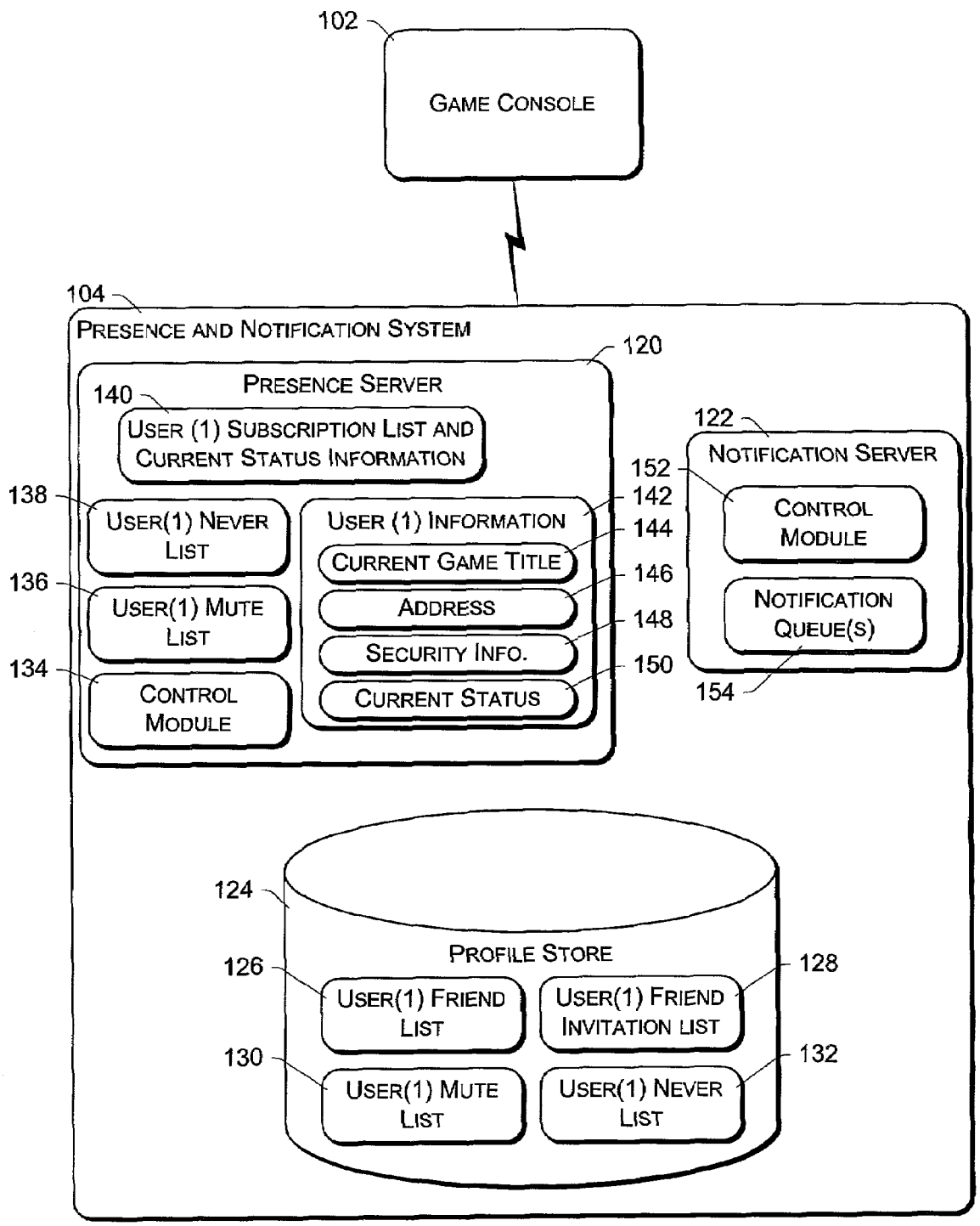
FIG. 2 is a block diagram illustrating an exemplary presence and notification system in additional detail.

FIG. 2 is a block diagram illustrating an exemplary presence and notification system 104 in additional detail. Presence and notification system 104 includes a presence server 120, a notification server 122, and a profile store 124. FIG. 2 is discussed with reference to information stored for a single user, referred to as user(1). It is to be appreciated, however, that analogous information is stored and processed by system 104 for multiple concurrent users logged in to system 104. These multiple users may be using the same and/or different game consoles as user(1).

Presence server 120 stores information regarding a user logged in to system 104. This information can include information regarding the user's current status (e.g., paused game play, not currently playing a game, cloaked, etc.). The cloaked status is included to allow the user to set a "cloaked" option, indicating to system 104 that any other user subscribing to the user's status information is to be informed that the user is not logged in, even though system 104 knows the user is logged in. This allows the user to log in and make use of various online services without advertising to any of his or her fiends that he or she is logged in.

Notification server 122 stores information to be communicated to a user. This information is stored in server 122 until it is either retrieved by the game console 102 being used by the user, or the user logs off the system.

Profile store 124 provides persistent storage for user information. The information stored in profile store 124 is that information that is to be maintained after a user logs off. Certain information, such as the game title the user was playing, security keys established during the log in to system 104 to allow secure communications between game console 102 and system 104, whether the user has paused the game, etc. becomes irrelevant when the user logs off and thus need not be maintained in profile store 124.

In the illustrated example, profile store 124 includes, for a particular user identified as user(1), a friend list 126, a friend invitation list 128, a mute list 130, and a never list 132. Although only a single set of lists 126-132 is illustrated for a single user (user(1)), profile store 124 maintains analogous lists for multiple users (e.g., a set of lists (a friend list, friend invitation list, mute list, and never list) for each user of presence and notification system 104).

Friend list 126 includes an identifier for each of the other users that user(1) has registered as a friend. Due to the mutuality discussed above, any user that is listed as the friend of user(1) also has user(1) listed as one of his or her friends. Additional information regarding friends may also be stored, such as flags to indicate "best" friends or commonly-played with friends, an indication of when the user became a friend, a nickname for the friend, etc.

Friend invitation list 128 includes an identifier for each other user that has requested to become a friend of user(1) while user(1) was not logged in to system 104. System 104 allows a user to invite another user to become his or her friend, even though that other user is not logged in at the time. When such an invitation is received, the inviting user's identifier is stored in list 128 and is processed (as discussed in more detail below) when user(1) logs in again to system 104.

Mute list 130 includes an identifier for each other user that user(1) has requested to mute. In certain embodiments, users are able to speak with one another via their consoles 102. In these embodiments, a user is also able to mute another user so that he or she does not receive any voice communications from that other user. The identifier of any such user that user(1) mutes is stored in mute list 130. Alternatively, list 130 may not be included (e.g., presence and notification system 104 may not support muting of other users, or voice communications between users may not be supported by game consoles 102 or other devices).

Never list 132 includes an identifier for each other user that user(1) never wants to be friends with. Situations can arise where user(1) simply never wants to be bothered by another user. In these situations, user(1) can have the other user's identifier added to never list 132 of user(1). This allows any invitations from the other user for user(1) to become a friend to be rejected by system 104 without notifying user(1) of the invitation, as discussed in more detail below. Alternatively, list 132 may not be included (e.g., in situations where presence and notification system 104 does not support the idea of identifying a user that is never to be a friend).

Although four separate lists are illustrated for user(1), one or more of the lists may be combined. For example, friend list 126 and friend invitation list 128 may be combined into a single list (e.g., with a flag or other identification mechanism to distinguish between friends and people who are requesting to become friends.).

The user identifiers discussed herein can be any of a wide variety of identifiers that uniquely identify the different users of presence and notification system 104. A user identifier may uniquely identify a user globally, or alternatively locally (e.g., uniquely within presence and notification system 104, or uniquely within a larger data center or other system that includes presence and notification system 104). In one exemplary implementation, the user identifiers are each a globally unique 64-bit identifier assigned to a user of a game console 102 when he or she registers to be able to log in to presence and notification system 104.

As used herein, the user identifiers identify a particular user regardless of which particular game console 102 he or she is using. Thus, a user can roam from one game console to another (e.g., from his or her home to another user's home) and maintain the same user identifier. The user identifier may be entered at a game console 102, and communicated to system 104, in a variety of manners, such as direct entry of the identifier by the user (e.g., using a keyboard or virtual keyboard), entry of a value or key sequence by the user which is used to generate the identifier, retrieval from a removable memory device carried by the user (optionally password protected so that only the user can authorize access to the identifier), etc.

When user(1) logs in to system 104, a control module 134 retrieves mute list 130 and never list 132 from profile store 124 and stores them in presence server 104 as lists 136 and 138, respectively. Any subsequent invitations from another user are checked by control module 134 against never list 138. If the inviting user is identified in list 138, then the invitation is rejected. This rejection can be made without notifying user(1), thereby keeping user(1) from being bothered by the inviting user. Similarly, any attempt to establish a voice communication channel with user(1) is checked against mute list 136. If the user attempting to establish the voice communication channel with user(1) is identified in list 136, then the attempt fails and the voice communication channel is not established.

When user(1) logs in to system 104, control module 134 also retrieves friend invitation list 128 from profile store 124 and, for each user identified in list 128, communicates an invitation to user(1) for user(1) to become a friend with the identified user. Based on the response by user(1), the identified user may then be added to friend list 126, never list 132, or added to no list. After receiving a response to the invitation, control module 134 removes the user identifier from friend invitation list 128. In situations where user(1) logs off without responding to the invitation, the user identifier remains on friend invitation list 128, so user(1) will receive another invitation when he or she again logs in.

Control module 134, in response to user(1) logging in to system 104, also retrieves friend list 126 from profile store 126. For each friend listed in friend list 126, control module 134 checks whether the user is logged in to system 104. If the user is logged in, the user is added to subscription list 140 for user(1) and user(1) subscribes to the user's status information. User(1) is also added to the subscription list for the user. Control module 134 further obtains the user's current status and stores it to subscription list 140, and also stores user(1)'s current status to the subscription list of the user. Any subsequent change of status of the user is reflected in subscription list 140 (and propagated to user(1) on game console 102, as discussed in more detail below). Presence server 120 maintains a subscription list 140 (which may have zero or more entries) corresponding to each user logged in to system 104. Presence server 120 can thus readily determine, given a particular user's identifier, whether the particular user is logged in to system 104. Alternatively, other mechanisms may be used to determine whether a particular user is logged in to system 104. For example, presence server 120 may maintain an additional list (not shown) including the user identifier of every user logged in to system 104.

It should be noted that any friend listed in friend list 126 that is not logged in to system 104 can simply be ignored (for the time being) by control module 134. Due to the mutuality of friends, when the friend subsequently logs in control module 134 performs an analogous process for the friend, which includes identifying that user(1) is logged in. In response to identifying user(1) as logged in, control module 134 will subscribe user(1) to the friend's information, and the friend to user(1)'s information.

When user(1) logs in to system 104, control module 134 further maintains additional information 142 regarding the current login session of user(1) in presence server 120. This information can change if the user logs out and subsequently logs back in. Any of a wide variety of information may be maintained as information 142. This information may vary based on the system 104 designer's choices or desires, and optionally on the desires of the designer or manufacturer of game console 102 or titles executing on game console 102. In the illustrated example, information 142 includes the current game title 144 (if any) being played by the user, the user's address 146, security information 148 for the user, and the user's current status 150.

Current game title 144 is the title of the current game executing on the game console 102 be used by the user(1). In situations where no game title is executing, game title 144 may be the title of the game on a removable disc inserted into game console 102, or alternatively may simply be blank or indicate "no title".

Address information 146 identifies the address of the user's game console 102. In one implementation, address information 146 comprises what is referred to as a fully qualified address or an XNADDR. The fully qualified address for game console 102 includes: the Ethernet MAC address for game console 102; the local IP address of the game console 102 (this is the IP address that the game console 102 believes it has, and may be different than the IP address from which presence server 120 receives data packets from game console 102 (e.g., due to an intermediary device between server 120 and game console 102, such as a NAT device (e.g., a router), or a gateway that is situated between system 104 and the Internet)); the IP address and port from which data packets are received from game console 102 (these may be received by server 120 or another intermediary device on behalf of server 120, such as a gateway situated between system 104 and the Internet); a logical gateway device number (an identifier assigned to a gateway device situated between system 104 and the Internet, the identifier uniquely identifying the gateway device within the a cluster of gateway devices); a Security Parameters Index (SPI) value corresponding to the secure communications channel between game console 102 and system 104 (or a gateway device situated between system 104 and the Internet); and a game console id (a unique identity (e.g., globally unique) of the particular game console 102).

Security information 148 stores security information (e.g., session identifier, session encryption key(s), etc.) for the current game session being played by the user (if any). This information 148 can be communicated to the game console of another user that is being invited to join (and/or is requesting to join) a game session to inform the other game console how to join the game session.

Current status 150 stores the current status of user(1). Different information may be stored as the current status, such as cross-title status (e.g., the name of the title the user is playing, whether the user has paused game play, whether the user is cloaked, various characteristics of the game console being used by the user (e.g., whether the user has a voice peripheral to allow voice communications, how many users are currently using the game console, etc.), changing of a user nickname, etc.), same-title status (e.g., game-specific information, such as health level, time remaining, current location, level change, changing of a user nickname, etc.), etc. In one exemplary implementation, a portion of the current status 150 is reserved for game-specific information. This reserved portion can be used by the various game titles to store whatever status information they desire (if any).

When the status of the user on game console 102 changes, game console 102 forwards the new status to presence server 120. Control module 134 changes current status 142 to reflect the new status, and also identifies each user in subscription list 140. Given the mutuality of friends, control module 134 also knows that each user identified in subscription list 140 also subscribes to information about user(1). So, control module 134 further updates the status of user(1) in the subscription list of each of these other users to reflect the new status.

When user(1) logs in to system 104, control module 152 of notification server 122 also establishes (e.g., generates in memory), in server 122, one or more notification queue(s) 154 corresponding to user(1). A different notification queue may be established for each different type of information that may be sent to game console 102, or alternatively a single queue including different types of information may be established. If a single queue includes different types of information, the different types may be identified in the queue (e.g., by a flag corresponding to each queue entry) or alternatively there may be no distinction between different types. For example, notification queue(s) 154 can include one or more of: a friends' current status notification queue (storing information regarding changes to the user's friends' status); a friend invitation notification queue (storing information regarding invitations to become friends, whether initiated by user(1) or another user); a game invitation notification queue (storing information regarding invitations to play games with other users, whether initiated by user(1) or another user); and a game invitation answer queue (storing information regarding answers to game invitations sent by user(1) or another user).

Control module 152 can be configured to allow a notification queue to store multiple pieces of information (that is, multiple queue entries) corresponding to the same user identifier, and allow another notification queue to store only one piece of information corresponding to the same user identifier. For example, the friends' current status notification queue may be configured to store only one piece of information per user identifier. Each time a new entry for the friends' current status notification queue is received by notification server 122 from presence server 120, control module 152 checks whether the user identifier for the new entry is already in the queue. If so, the previous entry is deleted and the new entry added (or the new entry may overwrite the previous entry); otherwise, the new entry is added to the queue. For example, if the user goes from the "playing game" status to the "paused" status then to the "offline" status then back to the "online" status and again to the "playing game" status all before the notified user polls system 104 for the information, all the user of the polling console really typically cares about is the most recent status ("playing game"), not all the preceding status.

When a user is no longer logged in to system 104, the information 142 and lists 136, 138, and 140 are no longer needed and are deleted from system 104. The notification queue(s) 154 corresponding to the user also are not needed and are deleted from system 104. Any changes that were made to lists 138 or 136 are saved to profile store 124 before being deleted from system 104. Alternatively, any changes to lists 138 or 136 may be written through to profile store 124 at the time the changes are made, thereby alleviating the need to write the lists to profile store 124 when the user is no longer logged in. A user can be no longer logged in due to the user explicitly logging off or becoming otherwise unavailable (e.g., powered-off his or her game console without specifically logging off). Presence system 104 may automatically detect a user that is no longer available (e.g., if expected data packets are not received from the game console at the expected times), or alternatively may be informed that the user is no longer available by some other device.

Figure 3:
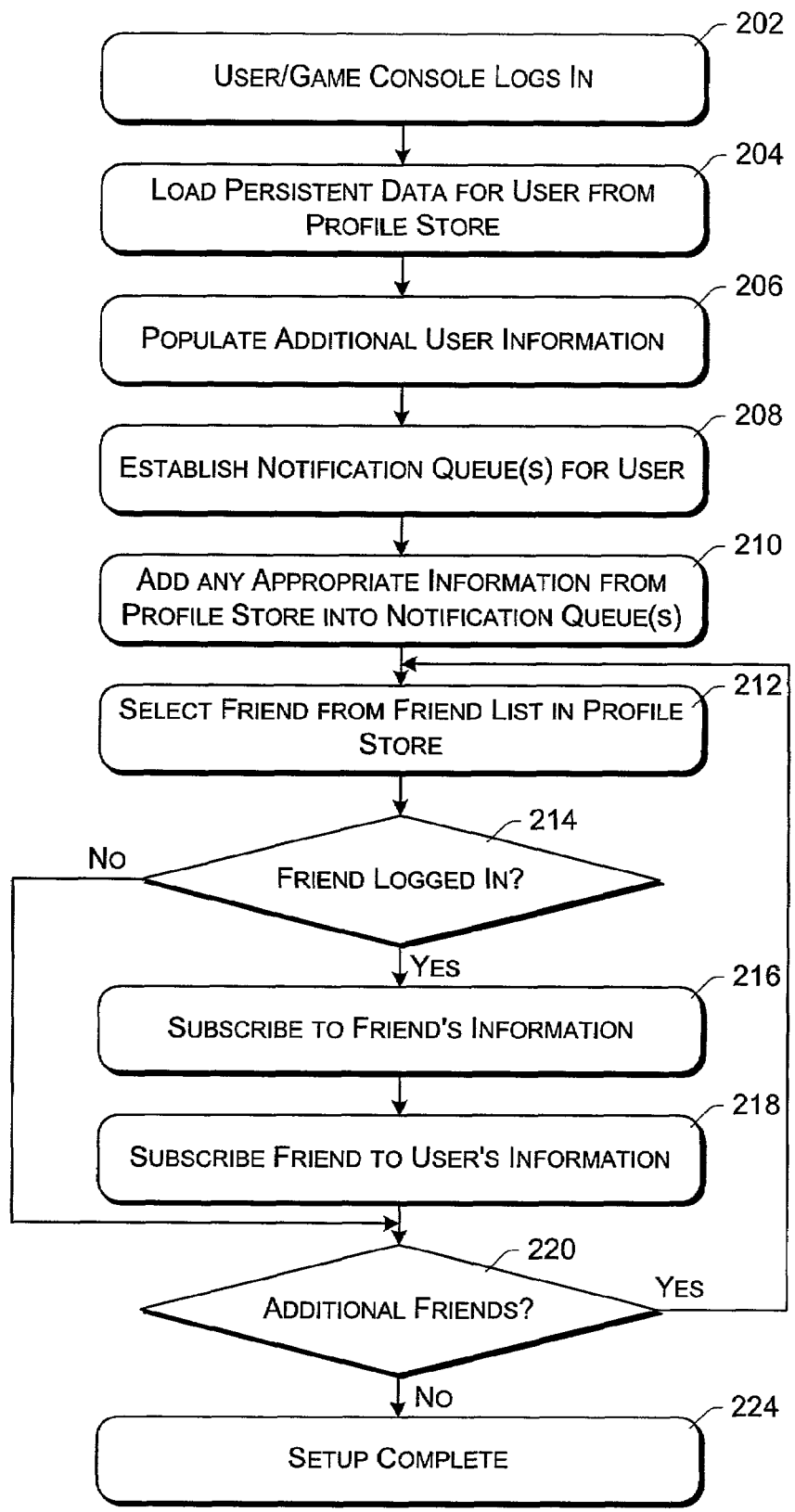
FIG. 3 is a flowchart illustrating an exemplary process for setting up a presence and notification system when a user logs in to the system.

FIG. 3 is a flowchart illustrating an exemplary process 200 for setting up presence and notification system 104 when a user logs in to system 104. The process of FIG. 3 is implemented by presence and notification system 104, and may be performed in software, firmware, hardware, or combinations thereof. The process of FIG. 3 is discussed with reference to components of FIGS. 1 and 2.

Initially, the user logs in to system 104 (act 202). Control module 134 loads the persistent data for the user from the profile store (act 204) and populates additional user information it is aware of (act 206). Additionally, control module 152 establishes notification queue(s) 154 corresponding to the user (act 208).

Control module 134 then forwards any appropriate information from the profile store into notification queue(s) 154 (act 210). For example, for any friend identified in friend invitation list 128, control module 134 adds a friend invitation to the friend invitation notification queue of queue(s) 154.

Control module 134 then selects a friend from the friend list in the profile store (act 212). This selection may be in any order (e.g., random, in numerical order based on user identifier, chronologically based on when identifiers were added to the friend list, etc.). Control module 134 then checks whether the selected friend is logged in (act 214). If the selected friend is logged in, then the user is subscribed to the friend's information (act 216), and the friend is subscribed to the user's information (act 218). After act 218, or if the selected friend is not logged in in act 214, control module 134 checks whether there are any friends in the friend list that have not yet been selected (act 220). If there are any such friends, then process 200 returns to select another friend (act 212). However, if all friends in the friend list have been selected, then setup is complete (act 224).

Figure 4:
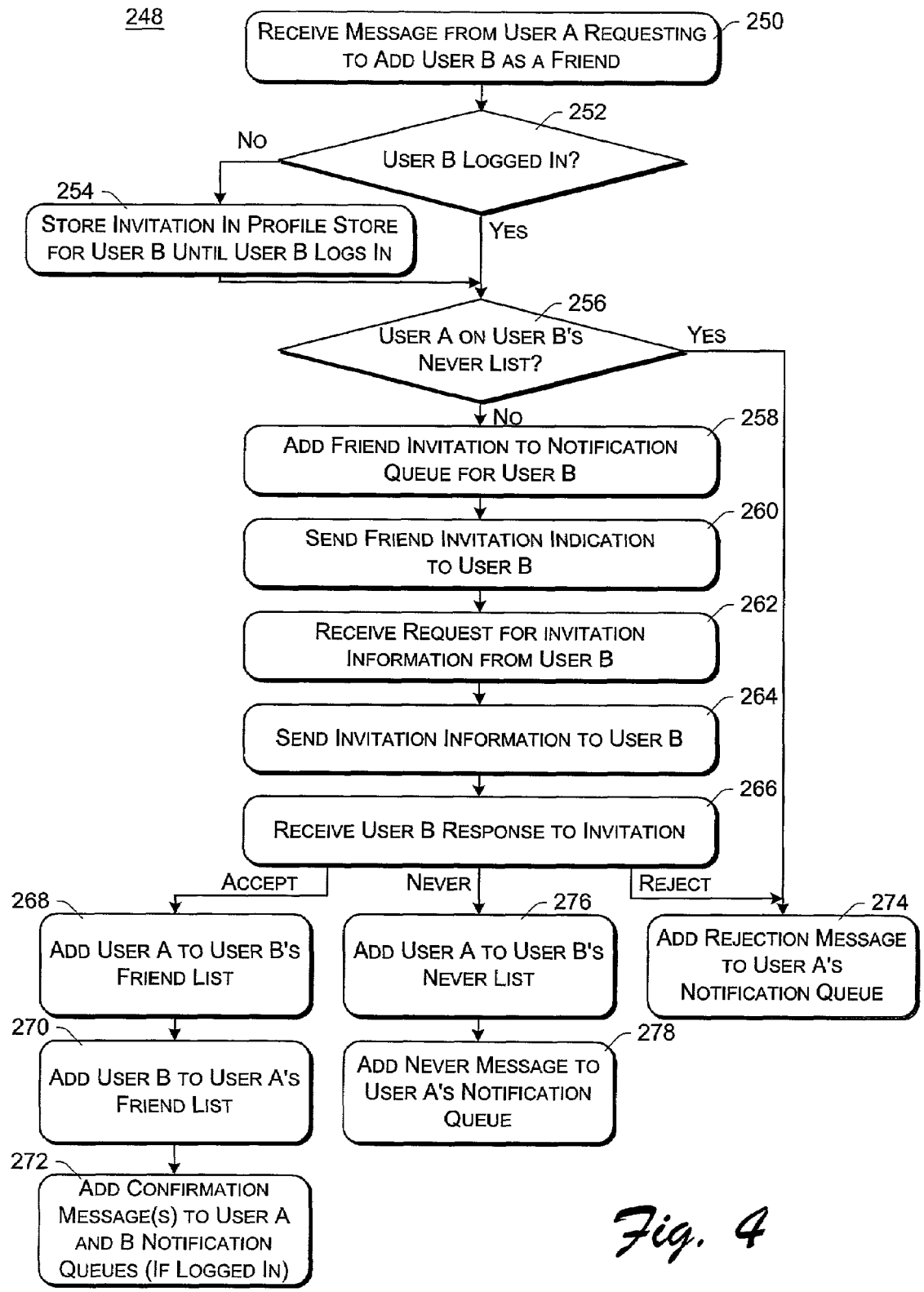
FIG. 4 is a flowchart illustrating an exemplary process for requesting to add another user as a friend.

FIG. 4 is a flowchart illustrating an exemplary process 248 for requesting to add another user as a friend. The process of FIG. 4 is implemented by presence and notification system 104, and may be performed in software, firmware, hardware, or combinations thereof. The process of FIG. 4 is discussed with reference to components of FIGS. 1 and 2, and with reference to two users, user A and user B.

Initially, control module 134 receives a message from user A requesting to add user B as a friend (act 250), and checks whether user B is logged in (act 252). If user B is not logged in, then the invitation is stored in the profile store for user B until user B logs in (act 254). This storage can be accomplished, for example, by adding the identifier of user B to the friend invitation list of user A in profile store 124.

If user B is logged in, or after user B logs in (after act 254), control module 134 checks whether user A is on user B's never list (act 256). If so, then control module 134 adds a rejection message to user A's notification queue (act 274). The rejection message indicates that the invitation has been rejected. This message is then eventually communicated to user A (assuming user A is still logged in). If user A is not on user B's never list, an add friend invitation is sent to the friend invitation notification queue for user B (act 258). An indication (tickle) is sent to user B (act 260), informing user B that invitation information is available for user B in the notification queue. Eventually, control module 152 receives a request for the invitation information from user B (act 262), which is the game console of user B polling notification server 122. In response, control module 152 sends the invitation information to user B (act 264), and eventually receives a response to the invitation from user B (act 266).

The response to the invitation can be an acceptance, a rejection, or a never indication. If an acceptance, control module 134 adds user A to user B's friend list (act 268), thereby subscribing user B to user A's information, and adds user B to user A's friend list (act 270), thereby subscribing user A to user B's information. Confirmation messages are then added to the notification queues of each of user A and user B that is still logged in (act 272), confirming the subscription of each user to the other's information. These messages, if any, are then eventually communicated to the appropriate ones of user A and user B. If user A and/or user B is not logged in, the confirmation message may optionally be stored in profile store 124 until the user logs in again.

If the response to the invitation is a rejection, then control module 134 adds a rejection message to user A's notification queue (act 274). The rejection message indicates that the invitation has been rejected. This message is then eventually communicated to user A (assuming user A is still logged in). If user A is not logged in, the rejection message may optionally be stored in profile store 124 until the user logs in again.

If the response to the invitation is a never indication, then control module 134 adds the user identifier of user A to user B's never list (act 276). Control module 134 adds a never message to user A's notification queue (act 278). The never message indicates that the invitation has been rejected and that user B never again wants to be invited to be user A's friend. This message is then eventually communicated to user A (assuming user A is still logged in). If user A is not logged in, the rejection message may optionally be stored in profile store 124 until the user logs in again. Alternatively, rather than sending a never message, a rejection message may be sent to user A.

Once a particular user is added to another user's never list, the particular user remains on that never list unless the other user sends an invitation for the particular user to be a friend. For example, if user A is added to user B's never list in act 276, then user A remains on user B's never list until user B invites user A to be a friend (in which case control module 134 removes user A from user B's never list). Alternatively, in some implementations an item may never be removed from the never list, or removed only under the control of an administrator of system 104.

Figure 5:
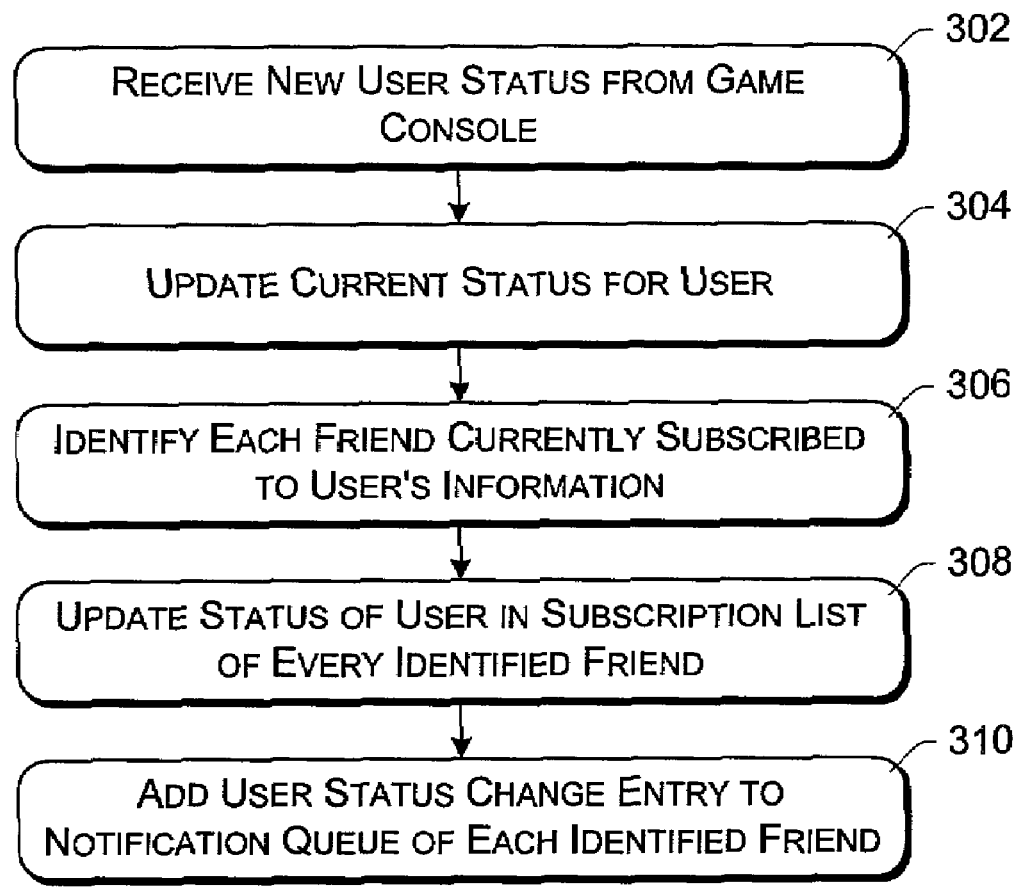
FIG. 5 is a flowchart illustrating an exemplary process for changing a user's status information.

FIG. 5 is a flowchart illustrating an exemplary process 300 for changing a user's status information. The process of FIG. 5 is implemented by presence and notification system 104, and may be performed in software, firmware, hardware, or combinations thereof. The process of FIG. 5 is discussed with reference to components of FIGS. 1 and 2.

Initially, control module 134 receives new user status data from the user's game console (act 302). Control module 134 updates the current status for the user in presence server 120 (act 304) to reflect the new user status, and also identifies each friend currently subscribed to the user's information (act 306). Control module 134 then updates the status of the user in the subscription list of every identified friend to reflect the new user status (act 308). Control module 134 then sends a user status change message control module 152 of notification server 122, causing control module 152 to add user status information to the notification queue of each identified friend (act 310).

Figure 6:
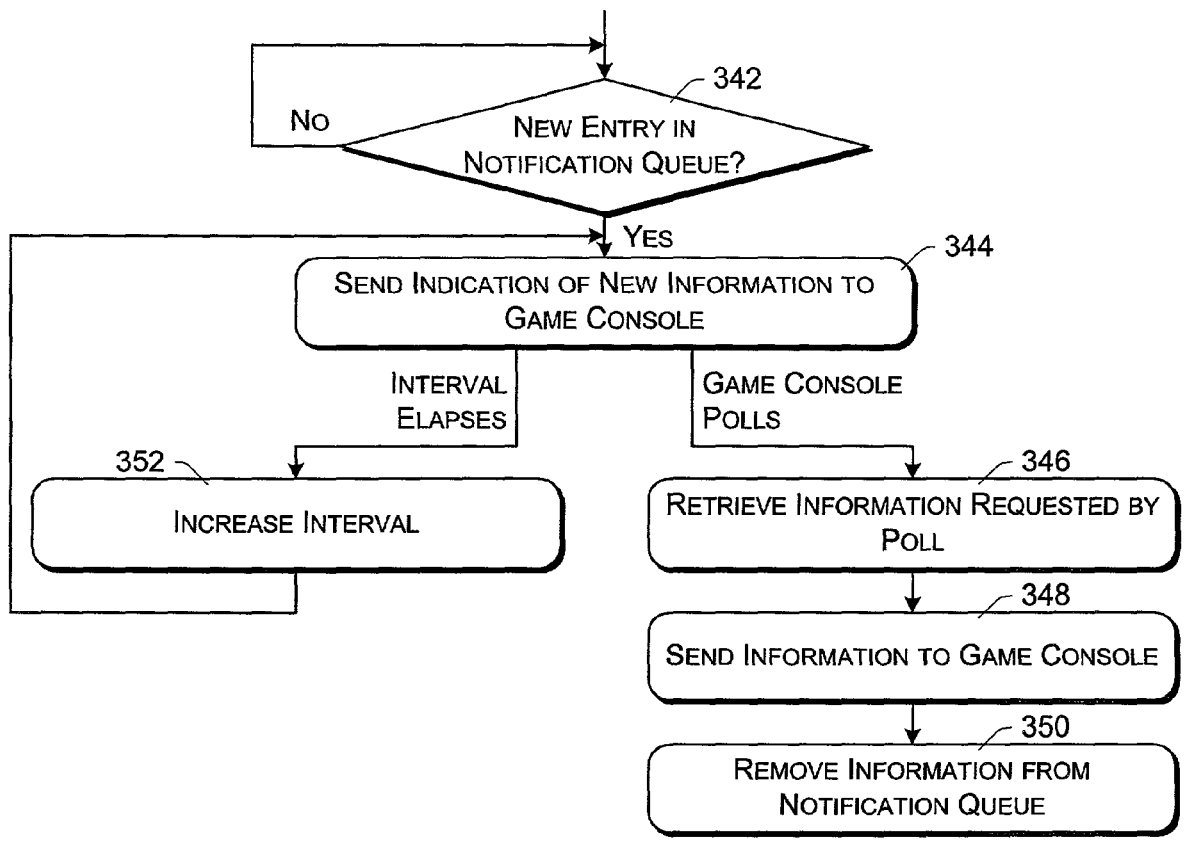
FIG. 6 is a flowchart illustrating an exemplary process for communicating information to a game console.

FIG. 6 is a flowchart illustrating an exemplary process 340 for communicating information to a game console. The process of FIG. 6 is implemented by presence and notification system 104, and may be performed in software, firmware, hardware, or combinations thereof. The process of FIG. 6 is discussed with reference to components of FIGS. 1 and 2.

Control module 152 of notification server 122 waits until a new entry is added to one of the notification queues for a user (act 342). This new entry may be any type of information to be communicated to the user associated with the notification queue, such as an invitation to become a friend, a change in a subscribed-to user's current status, an invitation to play a game (e.g., join a game session already playing or start a new game session), and so forth. When a new entry is added, an indication of the new information is sent to the game console (act 344). Control module 152 then proceeds based on whether the game console polls system 104 for the new information, or an interval of time has elapsed since the indication was sent in act 344 without the game console polling system 104. If the game console polls system 104, then control module 152 retrieves the information requested by the polling (act 346) and sends the retrieved information to the game console (act 348). The information is then removed from the notification queue (act 350). However, if the interval of time has elapsed, then the interval is increased (act 352) and control module 152 re-sends the indication (act 344). Control module 152 maintains a separate interval of time value for each indication sent (that is, one for each indication sent for each user logged in to system 104). Alternatively, the interval of time values maintained by control module 152 may be shared by multiple indications and/or multiple users.

Returning to FIG. 2, a copy of one or more of lists 126, 128, 130, and 132 may be stored on game console 102 as well. Alternatively, one or more lists, such as never list 132, may be maintained solely on system 104 and not copied to game console 102. By storing copies of the lists in game console 102, the amount of data that is to be downloaded to game console 102 each time the user logs in to system 104 can be reduced. For example, game console 102 may want to display to the user a list of all of his or her friends, allowing the user to browse the list, modify the list, etc. By maintaining a copy of the friend list 126 on game console 102, the game console does not need to download from system 104 the contents of the friend list each time the user requests the list. The list(s) stored on game console 102 can be persistently stored, such as by saving the list(s) to a hard drive of game console 102.

When multiple copies of a list are maintained in different locations (e.g., in profile store 124 and on game console 102), care should be taken to keep the multiple copies synchronized. In an exemplary implementation, this synchronization is performed using list version numbers. Each list to be stored on game console 102 has a version number associated with it. This version number is incremented each time the list is modified. When the user logs in to system 104, game console 102 checks the version(s) of the list(s) it has stored for the user against the version(s) of the corresponding list(s) stored in profile store 124. If the versions are the same, then no changes need be made. However, if a version of a list in profile store 124 does not match a version of a list on game console 102, then the copy of the list stored on game console 102 is modified to be the same as the copy of the list stored in profile store 124. This modification may be performed in different manners, such as control module 134 sending the entire list to game console 102 to replace the previous version of the list on game console 102, or by system 104 maintaining a record of the changes from version to version (e.g., a record stored in profile store 124 along with the list) and control module 134 sending only the changes to the list to game console 102.

It should be noted that, although only a single presence server 120 and a single notification server 122 are illustrated in FIG. 2, presence and notification system 104 may include multiple presence servers 122 and multiple notification servers 124. The number of presence servers 122 may be the same as, or alternatively be different than, the number of notification servers 124.

When multiple servers of the same type are included in system 104, a mechanism is included to associate users with particular servers. In one exemplary implementation, this mechanism is a hash value of the user's identifier (e.g., the 64-bit user identifier). Alternatively, a hash value may be generated based on one or more other pieces of data or identifiers associated with the user, such as the game console identifier of the game console the user is currently using, the game console identifier of the user's home game console, a game title identifier (e.g., the game currently being played), a game manufacturer identifier (e.g., of the game currently being played), etc. These other pieces of data may be used individually or alternatively may be combined (with each other and/or the user's identifier). If multiple identifiers are combined, they may be combined in any of a variety of manners (e.g., concatenated, added together, multiplied together, etc.).

Any of a wide variety of conventional hashing functions can be used to generate a hash value. Generally, the hashing function operates to generate an output value over a range of values that is smaller than the input values. Thus, for example, the 64-bit user identifier (which can be used to uniquely identify up to $2^{64}$ different users) can be hashed to an output value ranging from 1 to 3000. The hash output value range can vary, and in one implementation is designed to be equal to the most servers of the particular type that system 104 is anticipated to include (possibly allowing for future expansion).

The hash output value identifies a particular one of the servers that the user corresponds to, and thus a particular server that the user information is maintained on. Each server may be associated with one particular hash output value, or alternatively multiple hash output values. For example, if the hash output value ranges from 1 to 3000 and there are initially three presence servers in system 104, then hash output values ranging from 1 to 1000 may correspond to a first of the three servers, values ranging from 1001 to 2000 may correspond to a second of the three servers, values ranging from 2001 to 3000 may correspond to the third of the three servers. The hash output values can be assigned to the servers in any of a wide variety of manners, and need not be consecutive number ranges. If additional presence servers are later added to system 104, the hash output values assigned to the presence servers can be subsequently change. For example, if three additional presence servers are added to system 104 (totaling six presence servers), then hash output value ranging from 1 to 500 may correspond to a first of the six servers, values ranging from 501 to 1000 may correspond to a second of the six servers, values ranging from 1001 to 1500 may correspond to a third of the six servers, and so forth.

Whenever a particular one of the multiple presence servers 120 needs to be identified to determine where user information is stored, the hash function is applied to the user identifier (or other data associated with the user) and the corresponding presence server 120 identified based on the hash output value. An additional device (not shown in FIG. 2), such as another server, may be included in system 104 to receive data from the game consoles and identify which of the multiple presence servers 120 the corresponding user information is stored on.

Similarly, whenever a particular one of the multiple notification servers 122 needs to be identified to determine where notification queue(s) corresponding to a user information are stored, the function is applied to the user identifier (or other data associated with the user) and the corresponding notification server 122 identified based on the hash output value. This calculation can be performed, for example, by the device needing to identify where the notification queue(s) are stored, such as one of the presence servers 120.

The hashing function used to identify one of the multiple presence servers 120 may be the same as the hashing function used to identify one of the multiple notification servers 122, or alternatively may be different. In one exemplary implementation two different hash functions are used to generate two different values (one for identifying one of the presence servers 120 and the other for identifying one of the notification servers 122), thereby allowing the output hash values to scale differently, and allowing different numbers of notification servers than presence servers.

In situations where there are multiple presence servers 120, these presence servers may need to communicate information to one another. For example, if a particular user's status has changed, the control module 134 of the particular presence server 120 managing that particular user's information notifies each other presence server 120 that manages information for a user that subscribes to the particular user's information of the change in status. A message is sent by control module 134 to the control module 134 of each of these other presence servers 120 notifying them of the change in status. If multiple users that subscribe to the particular user's information are managed by the same presence server 120, then only a single message need be sent to that presence server 120. Alternatively, a different message may be sent for each user regardless of which presence server 120 they are managed by.

Although only a single presence and notification system 104 is illustrated in FIGS. 1 and 2, alternatively multiple such systems 104 may be accessible to game consoles 102. The multiple systems 104 may operate independently, or alternatively may communicate with one another in order to allow users of one system 104 to subscribe to information of a user of another system 104.

Messages communicated between game consoles 102 and presence and notification system 104 can take any of a wide variety of forms. In an exemplary implementation, a set of commands that can be communicated between a game console 102 and a system 104 include one or more of the following commands: alive, sync, nick name, refresh, add, delete, block, unblock, accept, reject, invite, answer invite, cancel invite, delete queue item, list, dequeue, and dead user. These commands are discussed in more detail below with reference to Tables I-XXI.

Table I shows the contents of a header that appears on all commands shown in Tables II-XXII.

TABLE I

| Parameter Name | Type | Description |
| --- | --- | --- |
| Message Type | DWORD | Type of the message |
| Message Length | DWORD | Length of the message |
| Sequence Number | DWORD | Command number for this connection. Expected to increment for each command. Used to resolve race conditions and match replies to commands. |

Tables II and III show an alive command (sent by a game console) and a reply (sent by a presence and notification system). The alive command is sent immediately after user login, and establishes the user's presence in the presence and notification system (and deactivates any other prior logins by the user). Updated friend (buddy) and mute lists are sent in the response if out of synchronization.

TABLE II

| Parameter Name | Type | Description |
| --- | --- | --- |
| User Information | | |
| User ID | QWORD | User that is going online |
| Account Name | WORD | Size of Account Name string, including the null character |
| | UTF-8 String | The string itself |
| Title ID | DWORD | Title the user is in |
| Game Console SG Address | SGADDR | Address of the user's game console (e.g., the fully qualified address, or an address internal to the presence and notification system or a larger system including the presence and notification system). |
| Sync Information | | |
| Buddy List Version | DWORD | Version number of the locally cached copy of the user's buddy list |
| Mute List Version | DWORD | Version number of the locally cached copy of the user's mute list |
| State Information | | |
| State | DWORD Bitmask | Cross title state information Bit 0: Is online Bit 1: Is playing Bit 2: Appear offline Bit 3: Has Voice Bit 4: Joinable session |
| Match Session ID | QWORD | Session ID of the game the user is in. Set to 0 if not in a joinable session. |
| Title Stuff | WORD | Size of Title Stuff data |
| | BYTE Array | The data itself |
| Nickname | WORD | Size of nickname data |
| | BYTE Array | The data itself |

TABLE III

| Parameter Name | Type | Description |
| --- | --- | --- |
| hr | HRESULT (DWORD) | Result code of the command |
| Buddy List Version | DWORD | Current version number of the buddy list |

TABLE III-continued

| Parameter Name | Type | Description |
|---|---|---|
| Buddy List Entries Sent | WORD | Number of buddy list entries sent in this response. 0 if the client is current. |
| Mute List Version | DWORD | Current version number of the mute list |
| Mute List Entries Sent | WORD | Number of mute list entries sent in this response. 0 if the client is current. |
| Buddy List Entry | | |
| Buddy ID | QWORD | Buddies' User ID |
| Status | BYTE | Ok, Pending or Request |
| Buddy Account Name | WORD | Size of Account Name string, including the null character |
| | ASCII String | The string itself |
| Mute List Entry | | |
| Mute ID | QWORD | Muted User's ID |
| Mute Account Name | WORD | Size of Account Name string, including the null character |
| | ASCII String | The string itself |

Tables IV and V show a sync command (sent by a game console) and a reply (sent by a presence and notification system). The sync command is sent by the game console when the game console believes it is out of synchronization with the presence and notification system.

TABLE IV

| Parameter Name | Type | Description |
|---|---|---|
| Game Console SG Address | SGADDR | Address of the user's game console (e.g., the fully qualified address, or an address internal to the presence and notification system or a larger system including the presence and notification system). |
| User ID | QWORD | Sender |
| Buddy List Version | DWORD | Version number of the locally cached copy of the user's buddy list |
| Mute List Version | DWORD | Version number of the locally cached copy of the user's mute list |

TABLE V

| Parameter Name | Type | Description |
|---|---|---|
| hr | HRESULT (DWORD) | Result code of the command |
| Buddy List Version | DWORD | Current version number of the buddy list |
| Buddy List Entries Sent | WORD | Number of buddy list entries sent in this response. 0 if the client is current. |
| Mute List Version | DWORD | Current version number of the mute list |
| Mute List Entries Sent | WORD | Number of mute list entries sent in this response. 0 if the client is current. |
| Buddy List Entry | | |
| Buddy ID | QWORD | Buddies' User ID |
| Status | BYTE | Ok, Pending or Request |
| Buddy Account Name | WORD | Size of Account Name string, including the null character |
| | ASCII String | The string itself |

TABLE V-continued

| Parameter Name | Type | Description |
|---|---|---|
| Mute List Entry | | |
| Mute ID | QWORD | Muted User's ID |
| Mute Account Name | WORD | Size of Account Name string, including the null character |
| | ASCII String | The string itself |

Table VI shows a nick name command, sent by a game console to change the nick name of a user of the game console.

TABLE VI

| Parameter Name | Type | Description |
|---|---|---|
| Game Console SG Address | SGADDR | Address of the user's game console (e.g., the fully qualified address, or an address internal to the presence and notification system or a larger system including the presence and notification system). |
| User ID | QWORD | Sender |
| Nickname | WORD | Size of nickname data |
| | BYTE Array | The data itself |

Table VII shows a refresh command, sent by a game console to refresh the items in the notification queue(s) (e.g., causing the presence server to repopulate the notification queue with current status information for each logged in friend, optionally having the presence server re-check which friends from the user's friends list are currently logged in).

TABLE VII

| Parameter Name | Type | Description |
|---|---|---|
| Game Console SG Address | SGADDR | Address of the user's game console (e.g., the fully qualified address, or an address internal to the presence and notification system or a larger system including the presence and notification system). |
| User ID | QWORD | Sender |

Table VIII shows an add command, sent by a game console to invite another user to become a friend (buddy). The command can identify the friend's user identifier, or an account name (e.g., a user-friendly name) associated with the user.

TABLE VIII

| Parameter Name | Type | Description |
|---|---|---|
| Game Console SG Address | SGADDR | Address of the user's game console (e.g., the fully qualified address, or an address internal to the presence and notification system or a larger system including the presence and notification system). |
| User ID | QWORD | Sender |
| Buddy ID | QWORD | User ID of the person requested as a buddy. Set to 0 if using account name. |
| Buddy Account Name | WORD | Size of Account Name string, including the null character. 0 if using User ID |
| | ASCII String | The string itself |

Table IX shows a delete command, sent by a game console to delete a friend (buddy) from the user's friend list, as well as delete the user from the friend's friend list.

TABLE IX

| Parameter Name | Type | Description |
| --- | --- | --- |
| Game Console SG Address | SGADDR | Address of the user's game console (e.g., the fully qualified address, or an address internal to the presence and notification system or a larger system including the presence and notification system). |
| User ID | QWORD | Sender |
| Buddy ID | QWORD | User ID of the buddy to delete. |

Table X shows a block command, sent by a game console to add a user to the mute list.

TABLE X

| Parameter Name | Type | Description |
| --- | --- | --- |
| Game Console SG Address | SGADDR | Address of the user's game console (e.g., the fully qualified address, or an address internal to the presence and notification system or a larger system including the presence and notification system). |
| User ID | QWORD | Sender |
| Mute ID | QWORD | User ID of the person being muted. Set to 0 if using account name. |
| Buddy Account Name | WORD | Size of Account Name string, including the null character. 0 if using User ID |
|  | ASCII String | The string itself |

Table XI shows an unblock command, sent by a game console to delete a user from the mute list. All users can be deleted from the mute list by setting the Mute ID to zero.

TABLE XI

| Parameter Name | Type | Description |
| --- | --- | --- |
| Game Console SG Address | SGADDR | Address of the user's game console (e.g., the fully qualified address, or an address internal to the presence and notification system or a larger system including the presence and notification system). |
| User ID | QWORD | Sender |
| Mute ID | QWORD | User ID of the person to mute/unmute or 0 to unmute everyone. |

Table XII shows an accept command, sent by a game console to accept an invitation to become another user's friend (buddy).

TABLE XII

| Parameter Name | Type | Description |
| --- | --- | --- |
| Game Console SG Address | SGADDR | Address of the user's game console (e.g., the fully qualified address, or an address internal to the presence and notification system or a larger system including the presence and notification system). |
| User ID | QWORD | Sender |
| Buddy ID | QWORD | User ID of the buddy to accept. |

Table XIII shows a reject command, sent by a game console to reject an invitation to become another user's friend (buddy).

TABLE XIII

| Parameter Name | Type | Description |
| --- | --- | --- |
| Game Console SG Address | SGADDR | Address of the user's game console (e.g., the fully qualified address, or an address internal to the presence and notification system or a larger system including the presence and notification system). |
| User ID | QWORD | Sender |
| Buddy ID | QWORD | User ID of the buddy to reject. |
| Never | BOOL | If true, add the user to the never list. The buddy will not be able to make another buddy request for this user. |

Table XIV shows an invite command, sent by a game console to invite friends (buddies) to join a hosted game session.

TABLE XIV

| Parameter Name | Type | Description |
| --- | --- | --- |
| Game Console SG Address | SGADDR | Address of the user's game console (e.g., the fully qualified address, or an address internal to the presence and notification system or a larger system including the presence and notification system). |
| User ID | QWORD | Sender |
| Match Session ID | QWORD | Session ID of the hosted game |
| Num Invitees | WORD | Number of users being invited or 0 to invite all of my buddies. |
| Invitee IDs | Array of QWORD | User IDs of invitees |

Table XV shows an answer invite command, sent by a game console to answer an invitation to join a hosted game session.

TABLE XV

| Parameter Name | Type | Description |
| --- | --- | --- |
| Game Console SG Address | SGADDR | Address of the user's game console (e.g., the fully qualified address, or an address internal to the presence and notification system or a larger system including the presence and notification system). |
| User ID | QWORD | Sender |
| Host ID | QWORD | Host the invite was from |
| Match Session ID | QWORD | Session ID of the hosted game |
| Response | WORD | Response being sent. Yes = 0 No = 1 |

Table XVI shows a cancel invite command, sent by a game console to cancel a previously sent invitation.

TABLE XVI

| Parameter Name | Type | Description |
| --- | --- | --- |
| Game Console SG Address | SGADDR | Address of the user's game console (e.g., the fully qualified address, or an address internal to the presence and notification system or a larger system including the presence and notification system). |

TABLE XVI-continued

| Parameter Name | Type | Description |
| --- | --- | --- |
| User ID | QWORD | Sender |
| Match Session ID | QWORD | Session ID of the hosted game |

Table XVII shows a delete queue item command, sent by a game console to delete one or more notification queue entries.

TABLE XVII

| Parameter Name | Type | Description |
| --- | --- | --- |
| Game Console SG Address | SGADDR | Address of the user's game console (e.g., the fully qualified address, or an address internal to the presence and notification system or a larger system including the presence and notification system). |
| User ID | QWORD | User to delete items from their queue |
| QType | WORD | Queue Type to delete from |
| First QUID | DWORD | First item to delete |
| Last QUID | DWORD | Last item to delete |

Tables XVIII and XIX show a list command and reply. The list command is sent by a game console to list items in a notification queue without deleting them from the queue. The reply is sent by the presence and notification system to the game console and includes the requested data.

TABLE XVIII

| Parameter Name | Type | Description |
| --- | --- | --- |
| Game Console SG Address | SGADDR | Address of the user's game console (e.g., the fully qualified address, or an address internal to the presence and notification system or a larger system including the presence and notification system). |
| User ID | QWORD | User to list entries from |
| QType | WORD | Queue Type to list entries from |
| Start QUID | DWORD | First queue item to send |
| Max Items | WORD | Maximum number of queue items to send |
| Max Total Item Data | DWORD | Maximum size of data to send |

TABLE XIX

| Parameter Name | Type | Description |
| --- | --- | --- |
| User ID | QWORD | User to list entries are from |
| QType | WORD | Queue Type to list entries are from |
| Hr | HRESULT | Result of the query. S_OK on success |
| Next QUID | DWORD | Next QUID after the listed items |
| QLeft | WORD | Number of items left after the listed items |
| Num Items | WORD | Number of items sent in this reply |
| Total Item Data | DWORD | Total Number of items sent |
| Queue Item Data | | |
| QUID | DWORD | Id of the item |
| Item Len | WORD | Length of the item |
| Item Data | BYTE Array | The data itself |

Tables XX and XXI show a dequeue command and reply. The dequeue command is sent by a game console to list items in a notification queue and delete them from the queue. The reply is sent by the presence and notification system to the game console and includes the requested data, and the requested data is deleted from the queue.

TABLE XX

| Parameter Name | Type | Description |
| --- | --- | --- |
| Game Console SG Address | SGADDR | Address of the user's game console (e.g., the fully qualified address, or an address internal to the presence and notification system or a larger system including the presence and notification system). |
| User ID | QWORD | User to list entries from |
| QType | WORD | Queue Type to list entries from |
| Start QUID | DWORD | First queue item to send |
| Max Items | WORD | Maximum number of queue items to send |
| Max Total Item Data | DWORD | Maximum size of data to send |

TABLE XXI

| Parameter Name | Type | Description |
| --- | --- | --- |
| User ID | QWORD | User to list entries are from |
| QType | WORD | Queue Type to list entries are from |
| Hr | HRESULT | Result of the query. S_OK on success |
| Next QUID | DWORD | Next QUID after the listed items |
| QLeft | WORD | Number of items left after the listed items |
| Num Items | WORD | Number of items sent in this reply |
| Total Item Data | DWORD | Total Number of items sent |
| Queue Item Data | | |
| QUID | DWORD | Id of the item |
| Item Len | WORD | Length of the item |
| Item Data | BYTE Array | The data itself |

Table XXII shows a dead user command. The dead user command is sent by a game console to change the set of users on a console (e.g., to indicate a particular user is no longer at the console).

TABLE XXII

| Parameter Name | Type | Description |
| --- | --- | --- |
| Game Console SG Address | SGADDR | Address of the user's game console (e.g., the fully qualified address, or an address internal to the presence and notification system or a larger system including the presence and notification system). |
| User ID | QWORD | User that is no longer at the console. |

Tables XXIII shows an exemplary indication or tickle sent by a presence and notification system to a game console (or other client device) to notify the game console that the presence and notification system has data for the game console.

TABLE XXIII

| Parameter Name | Type | Description |
| --- | --- | --- |
| Game Console SG Address | SGADDR | Address of the user's game console (e.g., the fully qualified address, or an address internal to the presence and notification system or a larger system including the presence and notification system). |
| SessionID | DWORD | User's Session Id, (e.g., from their SGADDR). |

TABLE XXIII-continued

| Parameter Name | Type | Description |
|---|---|---|
| UserID | QWORD | User the tickle is for |
| QType | WORD | Queue the tickle is from |
| QLength | DWORD | Current length of the queue when the tickle is sent. The queue may have since acquired more items. |
| Priority | BYTE | Priority of the message. Set to 1 on the first tickle for the first item in the queue, 0 for subsequent tickles as long as the queue remains non-empty. |

Figure 7:
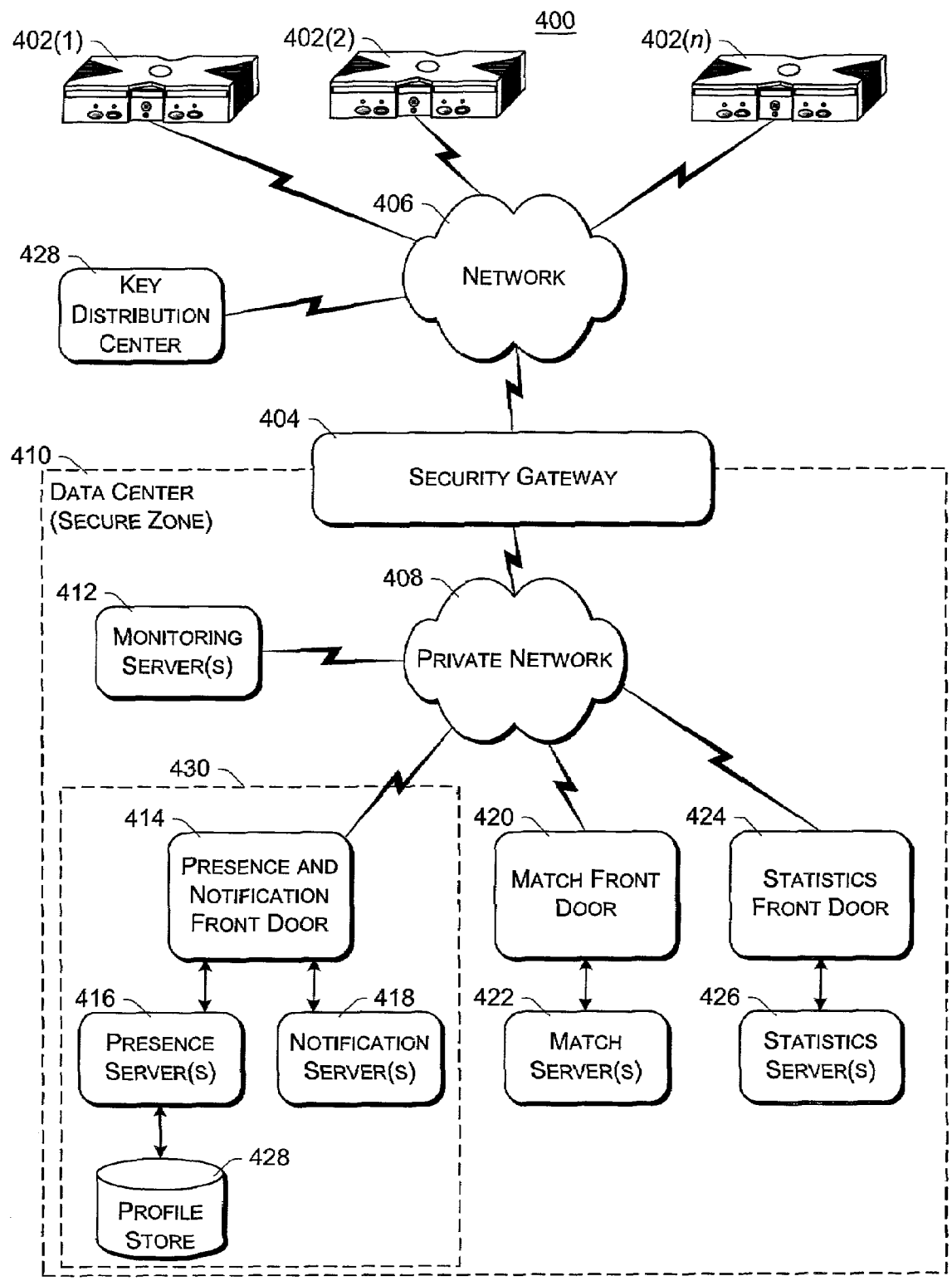
FIG. 7 is a block diagram of an exemplary online gaming environment.

FIG. 7 is a block diagram of an exemplary online gaming environment 400. Multiple game consoles 402(1), 402(2), ..., 402(n) are coupled to a security gateway 404 via a network 406. Each game console 402 can be, for example, a game console 102 of FIG. 1 or FIG. 2. Network 406 represents any one or more of a variety of conventional data communications networks. Network 406 will typically include packet switched networks, but may also include circuit switched networks. Network 406 can include wire and/or wireless portions. In one exemplary implementation, network 406 includes the Internet and may optionally include one or more local area networks (LANs) and/or wide area networks (WANs). At least a part of network 406 is a public network, which refers to a network that is publicly-accessible. Virtually anyone can access the public network.

In some situations, network 406 includes a LAN (e.g., a home network), with a routing device situated between game console 402 and security gateway 404. This routing device may perform network address translation (NAT), allowing the multiple devices on the LAN to share the same IP address on the Internet, and also operating as a firewall to protect the device(s) on the LAN from access by malicious or mischievous users via the Internet.

Security gateway 404 operates as a gateway between public network 406 and a private network 408. Private network 408 can be any of a wide variety of conventional networks, such as a local area network. Private network 408, as well as other devices discussed in more detail below, is within a data center 410 that operates as a secure zone. Data center 410 is made up of trusted devices communicating via trusted communications. Thus, encryption and authentication within secure zone 410 is not necessary. The private nature of network 408 refers to the restricted accessibility of network 408—access to network 408 is restricted to only certain individuals (e.g., restricted by the owner or operator of data center 410).

Security gateway 404 is a cluster of one or more security gateway computing devices. These security gateway computing devices collectively implement security gateway 404. Security gateway 404 may optionally include one or more conventional load balancing devices that operate to direct requests to be handled by the security gateway computing devices to appropriate ones of those computing devices. This directing or load balancing is performed in a manner that attempts to balance the load on the various security gateway computing devices approximately equally (or alternatively in accordance with some other criteria).

Also within data center 410 are: one or more monitoring servers 412; one or more presence and notification front doors 414, one or more presence servers 416, one or more notification servers 418, and a profile store 428 (collectively implementing a presence and notification service or system 430); one or more match front doors 420 and one or more match servers 422 (collectively implementing a match service); and one or more statistics front doors 424 and one or more statistics servers 426 (collectively implementing a statistics service). The servers 416, 418, 422, and 426 provide services to game consoles 402, and thus can be referred to as service devices. Other service devices may also be included in addition to, and/or in place of, one or more of the servers 416, 418, 422, and 426. Additionally, although only one data center is shown in FIG. 7, alternatively multiple data centers may exist with which game consoles 402 can communicate. These data centers may operate independently, or alternatively may operate collectively (e.g., to make one large data center available to game consoles 102).

Game consoles 402 are situated remotely from data center 410, and access data center 410 via network 406. A game console 402 desiring to communicate with one or more devices in the data center logs in to the data center and establishes a secure communication channel between the console 402 and security gateway 404. Game console 402 and security gateway 404 encrypt and authenticate data packets being passed back and forth, thereby allowing the data packets to be securely transmitted between them without being understood by any other device that may capture or copy the data packets without breaking the encryption. Each data packet communicated from game console 402 to security gateway 404, or from security gateway 404 to game console 402 can have data embedded therein. This embedded data is referred to as the content or data content of the packet. Additional information may also be inherently included in the packet based on the packet type (e.g., a heartbeat packet).

The secure communication channel between a console 402 and security gateway 404 is based on a security ticket. Console 402 authenticates itself and the current user(s) of console 402 to a key distribution center 428 and obtains, from key distribution center 428, a security ticket. Console 402 then uses this security ticket to establish the secure communication channel with security gateway 404. In establishing the secure communication channel with security gateway 404, the game console 402 and security gateway 404 authenticate themselves to one another and establish a session security key that is known only to that particular game console 402 and the security gateway 404. This session security key is used to encrypt data transferred between the game console 402 and the security gateway cluster 404, so no other devices (including other game consoles 402) can read the data. The session security key is also used to authenticate a data packet as being from the security gateway 404 or game console 402 that the data packet alleges to be from. Thus, using such session security keys, secure communication channels can be established between the security gateway 404 and the various game consoles 402.

Once the secure communication channel is established between a game console 402 and the security gateway 404, encrypted data packets can be securely transmitted between the two. When the game console 402 desires to send data to a particular service device in data center 410, the game console 402 encrypts the data and sends it to security gateway 404 requesting that it be forwarded to the particular service device(s) targeted by the data packet. Security gateway 404 receives the data packet and, after authenticating and decrypting the data packet, encapsulates the data content of the packet into another message to be sent to the appropriate service via private network 408. Security gateway 404 determines the appropriate service for the message based on the requested service(s) targeted by the data packet.

Similarly, when a service device in data center 410 desires to communicate data to a game console 402, the data center sends a message to security gateway 404, via private network 408, including the data content to be sent to the game console 402 as well as an indication of the particular game console 402 to which i the data content is to be sent. Security gateway 404 embeds the data content into a data packet, and then encrypts the data packet so it can only be decrypted by the particular game console 402 and also authenticates the data packet as being from the security gateway 404.

Although discussed herein as primarily communicating encrypted data packets between security gateway 404 and a game console 402, alternatively some data packets may be partially encrypted (some portions of the data packets are encrypted while other portions are not encrypted). Which portions of the data packets are encrypted and which are not can vary based on the desires of the designers of data center 410 and/or game consoles 402. For example, the designers may choose to allow voice data to be communicated among consoles 402 so that users of the consoles 402 can talk to one another—the designers may further choose to allow the voice data to be unencrypted while any other data in the packets is encrypted. Additionally, in another alternative, some data packets may have no portions that are encrypted (that is, the entire data packet is unencrypted). It should be noted that, even if a data packet is unencrypted or only partially encrypted, all of the data packet can still be authenticated.

Each security gateway device in security gateway 404 is responsible for the secure communication channel with typically one or more game consoles 402, and thus each security gateway device can be viewed as being responsible for managing or handling one or more game consoles. The various security gateway devices may be in communication with each other and communicate messages to a one another. For example, a security gateway device that needs to send a data packet to a game console that it is not responsible for managing may send a message to all the other security gateway devices with the data to be sent to that game console. This message is received by the security gateway device that is responsible for managing that game console and sends the appropriate data to that game console. Alternatively, the security gateway devices may be aware of which game consoles are being handled by which security gateway devices—this may be explicit, such as each security gateway device maintaining a table of game consoles handled by the other security gateway devices, or alternatively implicit, such as determining which security gateway device is responsible for a particular game console based on an identifier of the game console.

Monitoring server(s) 412 operate to inform devices in data center 410 of an unavailable game console 402 or an unavailable security gateway device of security gateway 404. Game consoles 402 can become unavailable for a variety of different reasons, such as a hardware or software failure, the console being powered-down without logging out of data center 410, the network connection cable to console 402 being disconnected from console 402, other network problems (e.g., the LAN that the console 402 is on malfunctioning), etc. Similarly, a security gateway device of security gateway 404 can become unavailable for a variety of different reasons, such as hardware or software failure, the device being powered-down, the network connection cable to the device being disconnected from the device, other network problems, etc.

Each of the security gateway devices in security gateway 404 is monitored by one or more monitoring servers 412, which detect when one of the security gateway devices becomes unavailable. In the event a security gateway device becomes unavailable, monitoring server 412 sends a message to each of the other devices in data center 410 (servers, front doors, etc.) that the security gateway device is no longer available. Each of the other devices can operate based on this information as it sees fit (e.g., it may assume that particular game consoles being managed by the security gateway device are no longer in communication with data center 410 and perform various clean-up operations accordingly). Alternatively, only certain devices may receive such a message from the monitoring server 412 (e.g., only those devices that are concerned with whether security gateway devices are available).

Security gateway 404 monitors the individual game consoles 402 and detects when one of the game consoles 402 becomes unavailable. When security gateway 404 detects that a game console is no longer available, security gateway 404 sends a message to monitoring server 412 identifying the unavailable game console. In response, monitoring server 412 sends a message to each of the other devices in data center 410 (or alternatively only selected devices) that the game console is no longer available. Each of the other devices can then operate based on this information as it sees fit.

Presence and notification system or service 430 can be, for example, a system 104 of FIG. 1 or 2. Presence server(s) 416 hold and process data concerning the status or presence of a given user logged in to data center 410 for online gaming. Notification server(s) 418 maintains multiple notification queues of outgoing messages destined for a player logged in to data center 410. Presence and notification front door 414 is one or more server devices that operate as an intermediary between security gateway 404 and servers 416 and 418. One or more load balancing devices (not shown) may be included in presence and notification front door 414 to balance the load among the multiple server devices operating as front door 414. Security gateway 404 communicates messages for servers 416 and 418 to the front door 414, and the front door 414 identifies which particular server 416 or particular server 418 the message is to be communicated to. By using front door 414, the actual implementation of servers 416 and 418, such as which servers are responsible for managing data regarding which users, is abstracted from security gateway 404. Security gateway 404 can simply forward messages that target the presence and notification service to presence and notification front door 414 and rely on front door 414 to route the messages to the appropriate one of server(s) 416 and server(s) 418.

Match server(s) 422 hold and process data concerning the matching of online players to one another. An online user is able to advertise a game available for play along with various characteristics of the game (e.g., the location where a football game will be played, whether a game is to be played during the day or at night, the user's skill level, etc.). These various characteristics can then be used as a basis to match up different online users to play games together. Match front door 420 includes one or more server devices (and optionally a load balancing device(s)) and operates to abstract match server(s) 422 from security gateway 404 in a manner analogous to front door 414 abstracting server(s) 416 and server(s) 418.

Statistics server(s) 426 hold and process data concerning various statistics for online games. The specific statistics used can vary based on the game designer's desires (e.g., the top ten scores or times, a world ranking for all online players of the game, a list of users who have found the most items or spent the most time playing, etc.). Statistics front door 426 includes one or more server devices (and optionally a load balancing device(s)) and operates to abstract statistics server(s) 426 from security gateway 404 in a manner analogous to front door 414 abstracting server(s) 416 and server(s) 418.

Thus, it can be seen that security gateway 404 operates to shield devices in the secure zone of data center 410 from the untrusted, public network 406. Communications within the secure zone of data center 410 need not be encrypted, as all devices within data center 410 are trusted. However, any information to be communicated from a device within data center 410 to a game console 402 passes through security gateway cluster 404, where it is encrypted in such a manner that it can be decrypted by only the game console 402 targeted by the information.

Figure 8:
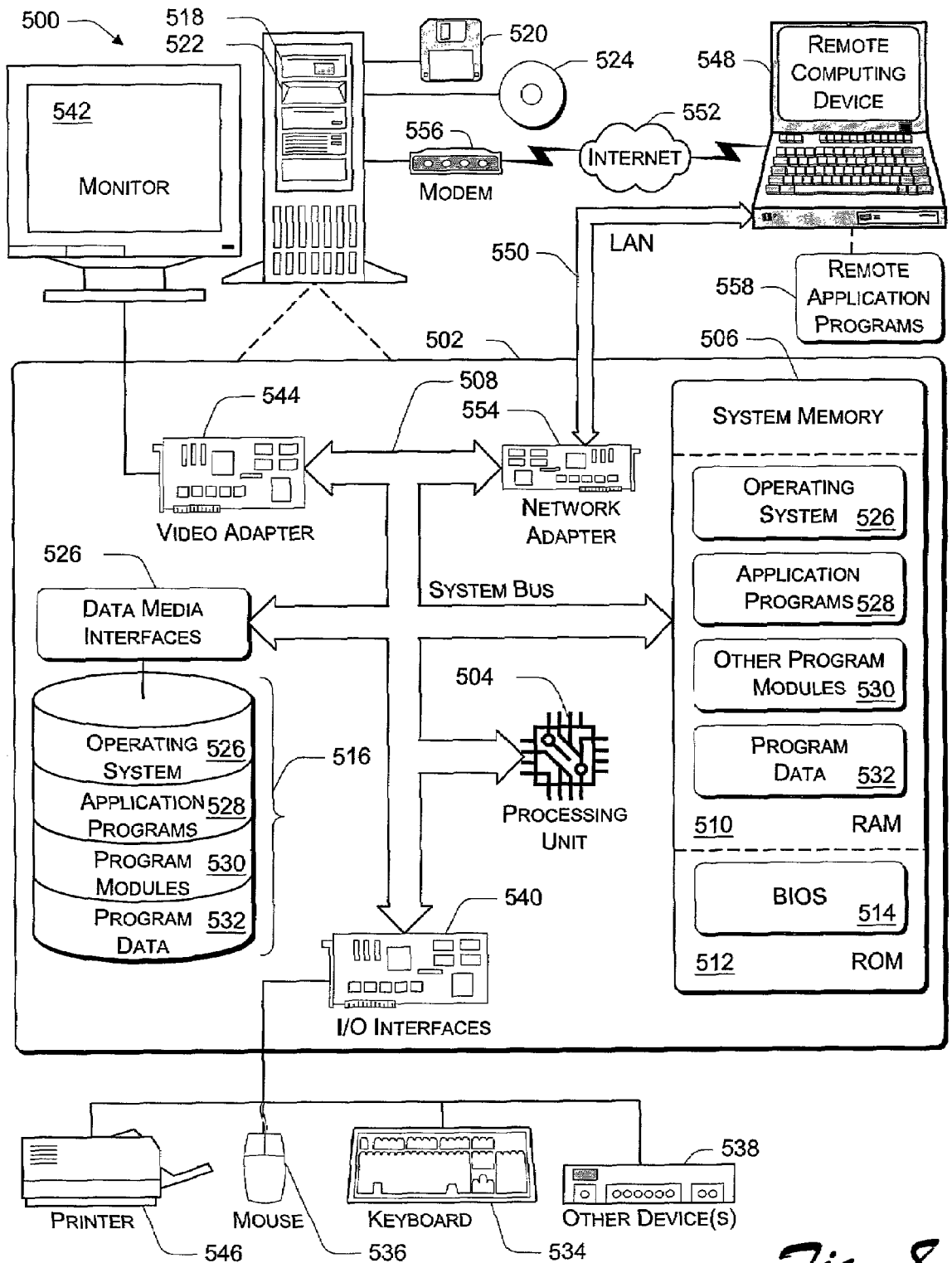
FIG. 8 illustrates a general computer environment, which can be used to implement the techniques described herein.

FIG. 8 illustrates a general computer environment 500, which can be used to implement the techniques described herein. The computer environment 500 is only one example of a computing environment and is not intended to suggest any limitation as to the scope of use or functionality of the computer and network architectures. Neither should the computer environment 500 be interpreted as having any dependency or requirement relating to any one or combination of components illustrated in the exemplary computer environment 500.

Computer environment 500 includes a general-purpose computing device in the form of a computer 502. Computer 502 can be, for example, a presence and notification system 104 of FIG. 1, a presence server 120 of FIG. 2, a notification server 122 of FIG. 2, a profile store of FIG. 2, a security gateway 404 of FIG. 7, a server 412, 416, 418, 422, and/or 426 of FIG. 7, a profile store 428 of FIG. 7, or a front door 414, 420, or 424 of FIG. 7. The components of computer 502 can include, but are not limited to, one or more processors or processing units 504 (optionally including a cryptographic processor or co-processor), a system memory 506, and a system bus 508 that couples various system components including the processor 504 to the system memory 506.

The system bus 508 represents one or more of any of several types of bus structures, including a memory bus or memory controller, a peripheral bus, an accelerated graphics port, and a processor or local bus using any of a variety of bus architectures. By way of example, such architectures can include an Industry Standard Architecture (ISA) bus, a Micro Channel Architecture (MCA) bus, an Enhanced ISA (EISA) bus, a Video Electronics Standards Association (VESA) local bus, and a Peripheral Component Interconnects (PCI) bus also known as a Mezzanine bus.

Computer 502 typically includes a variety of computer readable media. Such media can be any available media that is accessible by computer 502 and includes both volatile and non-volatile media, removable and non-removable media.

The system memory 506 includes computer readable media in the form of volatile memory, such as random access memory (RAM) 510, and/or non-volatile memory, such as read only memory (ROM) 512. A basic input/output system (BIOS) 514, containing the basic routines that help to transfer information between elements within computer 502, such as during start-up, is stored in ROM 512. RAM 510 typically contains data and/or program modules that are immediately accessible to and/or presently operated on by the processing unit 504.

Computer 502 may also include other removable/non-removable, volatile/non-volatile computer storage media. By way of example, FIG. 7 illustrates a hard disk drive 516 for reading from and writing to a non-removable, non-volatile magnetic media (not shown), a magnetic disk drive 518 for reading from and writing to a removable, non-volatile magnetic disk 520 (e.g., a "floppy disk"), and an optical disk drive 522 for reading from and/or writing to a removable, non-volatile optical disk 524 such as a CD-ROM, DVD-ROM, or other optical media. The hard disk drive 516, magnetic disk drive 518, and optical disk drive 522 are each connected to the system bus 508 by one or more data media interfaces 526. Alternatively, the hard disk drive 516, magnetic disk drive 518, and optical disk drive 522 can be connected to the system bus 508 by one or more interfaces (not shown).

The disk drives and their associated computer-readable media provide non-volatile storage of computer readable instructions, data structures, program modules, and other data for computer 502. Although the example illustrates a hard disk 516, a removable magnetic disk 520, and a removable optical disk 524, it is to be appreciated that other types of computer readable media which can store data that is accessible by a computer, such as magnetic cassettes or other magnetic storage devices, flash memory cards, CD-ROM, digital versatile disks (DVD) or other optical storage, random access memories (RAM), read only memories (ROM), electrically erasable programmable read-only memory (EEPROM), and the like, can also be utilized to implement the exemplary computing system and environment.

Any number of program modules can be stored on the hard disk 516, magnetic disk 520, optical disk 524, ROM 512, and/or RAM 510, including by way of example, an operating system 526, one or more application programs 528, other program modules 530, and program data 532. Each of such operating system 526, one or more application programs 528, other program modules 530, and program data 532 (or some combination thereof) may implement all or part of the resident components that support the distributed file system.

A user can enter commands and information into computer 502 via input devices such as a keyboard 534 and a pointing device 536 (e.g., a "mouse"). Other input devices 538 (not shown specifically) may include a microphone, joystick, game pad, satellite dish, serial port, scanner, and/or the like. These and other input devices are connected to the processing unit 504 via input/output is interfaces 540 that are coupled to the system bus 508, but may be connected by other interface and bus structures, such as a parallel port, game port, or a universal serial bus (USB).

A monitor 542 or other type of display device can also be connected to the system bus 508 via an interface, such as a video adapter 544. In addition to the monitor 542, other output peripheral devices can include components such as speakers (not shown) and a printer 546 which can be connected to computer 502 via the input/output interfaces 540.

Computer 502 can operate in a networked environment using logical connections to one or more remote computers, such as a remote computing device 548. By way of example, the remote computing device 548 can be a personal computer, portable computer, a server, a router, a network computer, a peer device or other common network node, game console, and the like. The remote computing device 548 is illustrated as a portable computer that can include many or all of the elements and features described herein relative to computer 502.

Logical connections between computer 502 and the remote computer 548 are depicted as a local area network (LAN) 550 and a general wide area network (WAN) 552. Such networking environments are commonplace in offices, enterprise-wide computer networks, intranets, and the Internet.

When implemented in a LAN networking environment, the computer 502 is connected to a local network 550 via a network interface or adapter 554. When implemented in a WAN networking environment, the computer 502 typically includes a modem 556 or other means for establishing communications over the wide network 552. The modem 556, which can be internal or external to computer 502, can be connected to the system bus 508 via the input/output interfaces 540 or other appropriate mechanisms. It is to be appreciated that the illustrated network connections are exemplary and that other means of establishing communication link(s) between the computers 502 and 548 can be employed.

In a networked environment, such as that illustrated with computing environment 500, program modules depicted relative to the computer 502, or portions thereof, may be stored in a remote memory storage device. By way of example, remote application programs 558 reside on a memory device of remote computer 548. For purposes of illustration, application programs and other executable program components such as the operating system are illustrated herein as discrete blocks, although it is recognized that such programs and components reside at various times in different storage components of the computing device 502, and are executed by the data processor(s) of the computer.

Various modules and techniques may be described herein in the general context of computer-executable instructions, such as program modules, executed by one or more computers or other devices. Generally, program modules include routines, programs, objects, components, data structures, etc. that perform particular tasks or implement particular abstract data types. Typically, the functionality of the program modules may be combined or distributed as desired in various embodiments.

An implementation of these modules and techniques may be stored on or transmitted across some form of computer readable media. Computer readable media can be any available media that can be accessed by a computer. By way of example, and not limitation, computer readable media may comprise "computer storage media" and "communications media."

"Computer storage media" includes volatile and non-volatile, removable and non-removable media implemented in any method or technology for storage of information such as computer readable instructions, data structures, program modules, or other data. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by a computer.

"Communication media" typically embodies computer readable instructions, data structures, program modules, or other data in a modulated data signal, such as carrier wave or other transport mechanism. Communication media also includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared, and other wireless media. Combinations of any of the above are also included within the scope of computer readable media.

Figure 9:
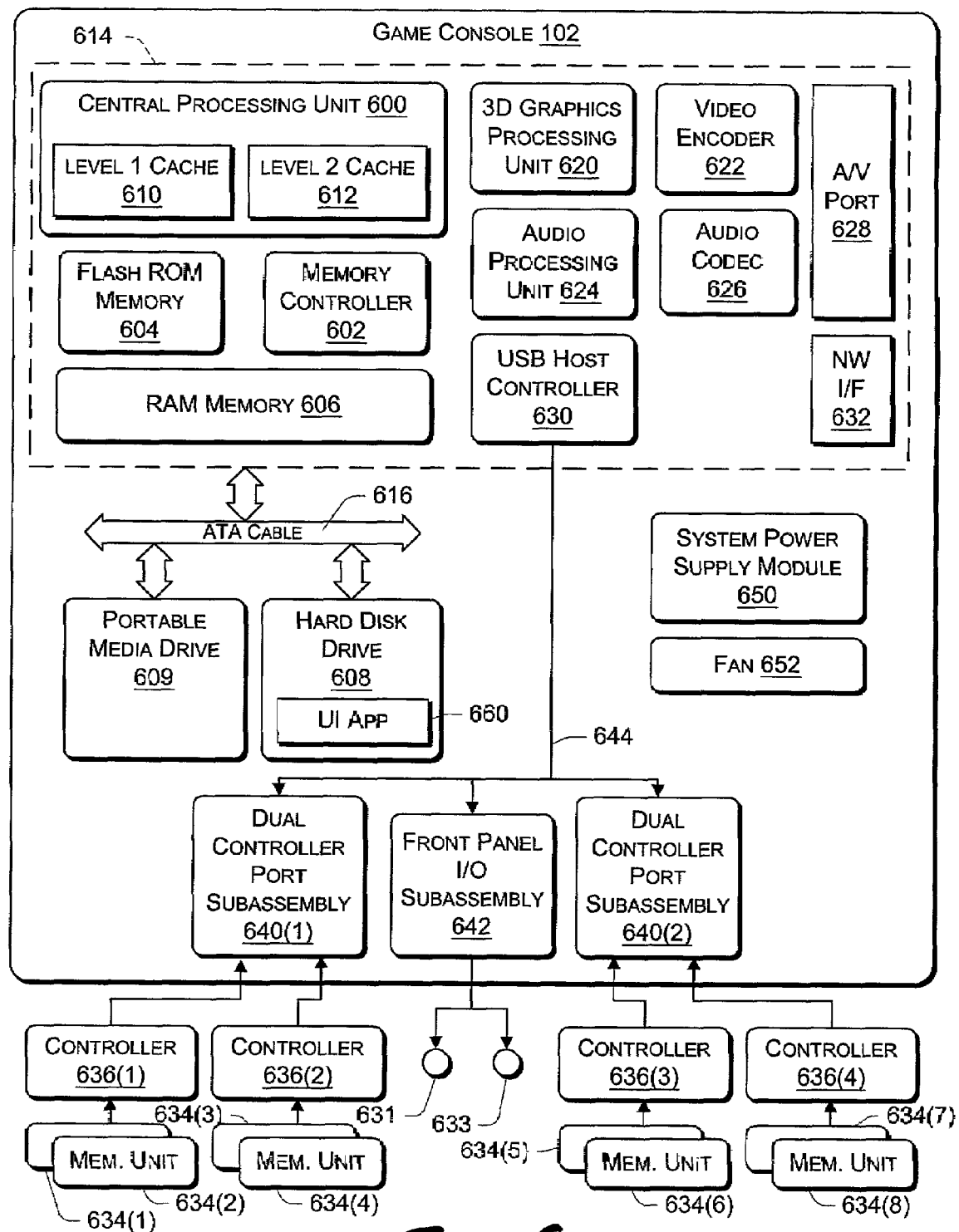
FIG. 9 shows functional components of a game console in more detail.

FIG. 9 shows functional components of a game console 102 in more detail. Game console 102 has a central processing unit (CPU) 600 and a memory controller 602 that facilitates processor access to various types of memory, including a flash ROM (Read Only Memory) 604, a RAM (Random Access Memory) 606, a hard disk drive 608, and a portable media drive 609. CPU 600 is equipped with a level 1 cache 610 and a level 2 cache 612 to temporarily store data and hence reduce the number of memory access cycles, thereby improving processing speed and throughput.

CPU 600, memory controller 602, and various memory devices are interconnected via one or more buses, including serial and parallel buses, a memory bus, a peripheral bus, and a processor or local bus using any of a variety of bus architectures. By way of example, such architectures can include an Industry Standard Architecture (ISA) bus, a Micro Channel Architecture (MCA) bus, an Enhanced ISA (EISA) bus, a Video Electronics Standards Association (VESA) local bus, and a Peripheral Component Interconnects (PCI) bus also known as a Mezzanine bus.

As one suitable implementation, CPU 600, memory controller 602, ROM 604, and RAM 606 are integrated onto a common module 614. In this implementation, ROM 604 is configured as a flash ROM that is connected to the memory controller 602 via a PCI (Peripheral Component Interconnect) bus and a ROM bus (neither of which are shown). RAM 606 is configured as multiple DDR SDRAM (Double Data Rate Synchronous Dynamic RAM) that are independently controlled by the memory controller 602 via separate buses (not shown). The hard disk drive 608 and portable media drive 609 are connected to the memory controller via the PCI bus and an ATA (AT Attachment) bus 616.

A 3D graphics processing unit 620 and a video encoder 622 form a video processing pipeline for high speed and high resolution graphics processing. Data is carried from the graphics processing unit 620 to the video encoder 622 via a digital video bus (not shown). An audio processing unit 624 and an audio codec (coder/decoder) 626 form a corresponding audio processing pipeline with high fidelity and stereo processing. Audio data is carried between the audio processing unit 624 and the audio codec 626 via a communication link (not shown). The video and audio processing pipelines output data to an A/V (audio/video) port 628 for transmission to the television or other display. In the illustrated implementation, the video and audio processing components 620-628 are mounted on the module 614.

Also implemented on the module 614 are a USB host controller 630 and a network interface 632. The USB host controller 630 is coupled to the CPU 600 and the memory controller 602 via a bus (e.g., PCI bus) and serves as host for the peripheral controllers 636(1)-636(4). The network interface 632 provides access to a network (e.g., Internet, home network, etc.) and may be any of a wide variety of various wire or wireless interface components including an Ethernet card, a modem, a Bluetooth module, a cable modem, and the like.

The game console 102 has two dual controller support subassemblies 640(1) and 640(2), with each subassembly supporting two game controllers 636(1)-636(4). A front panel I/O subassembly 642 supports the functionality of a power button 631 and a media drive eject button 633, as well as any LEDs (light emitting diodes) or other indicators exposed on the outer surface of the game console. The subassemblies 640(1), 640(2), and 642 are coupled to the module 614 via one or more cable assemblies 644.

Eight memory units 634(1)-634(8) are illustrated as being connectable to the four controllers 636(1)-636(4), i.e., two memory units for each controller. Each memory unit 634 offers additional storage on which games, game parameters, and other data may be stored. When inserted into a controller, the memory unit 634 can be accessed by the memory controller 602.

A system power supply module 650 provides power to the components of the game console 102. A fan 652 cools the circuitry within the game console 102.

A console user interface (UI) application 660 is stored on the hard disk drive 608. When the game console is powered on, various portions of the console application 660 are loaded into RAM 606 and/or caches 610, 612 and executed on the CPU 600. Console application 660 presents a graphical user interface that provides a consistent user experience when navigating to different media types available on the game console.

Game console 102 implements a cryptography engine to perform common cryptographic functions, such as encryption, decryption, authentication, digital signing, hashing, and the like. The cryptography engine may be implemented as part of the CPU 600, or in software stored on the hard disk drive 608 that executes on the CPU, so that the CPU is configured to perform the cryptographic functions. Alternatively, a cryptographic processor or co-processor designed to perform the cryptographic functions may be included in game console 102.

Game console 102 may be operated as a standalone system by simply connecting the system to a television or other display. In this standalone mode, game console 102 allows one or more players to play games, watch movies, or listen to music. However, with the integration of broadband connectivity made available through the network interface 632, game console 102 may further be operated as a participant in online gaming, as discussed above.

In the discussions herein, a significant amount of functionality is provided by presence and notification system 104. In alternate embodiments, this functionality, or portions of this functionality, may be provided by one or more of the game consoles 102.

Although the description above uses language that is specific to structural features and/or methodological acts, it is to be understood that the invention defined in the appended claims is not limited to the specific features or acts described. Rather, the specific features and acts are disclosed as exemplary forms of implementing the invention.

The invention claimed is:

1. A method, comprising:
    loading, by a computing device, when a first user logs in to a system, persistent data for the user from a profile store;
    identifying, by the computing device, from the persistent data, one or more friends of the first user, the persistent data including a list of second users that the first user never wants to be friends with;
    identifying, by the computing device, based on an identifier associated with the first user, which of a plurality of notification servers to load the persistent data to;
    establishing, by the computing device, at least one notification queue for the first user;
    checking, by the computing device, whether any information in the profile store is to be added to the at least one notification queue;
    adding, by the computing device, based on the checking, information to the at least one notification queue;
    facilitating, by the computing device, the first user in adding a third user to the list;
    receiving, by the computing device, a friend invitation from the third user;
    sending, by the computing device, to the third user a response message to the friend invitation without notifying the first user of receipt of the friend invitation and without notifying the first user of the response message, the response message indicating that the first user has rejected the friend invitation;
    checking, by the computing device, whether each of the one or more friends is logged in to the system;
    for each of the one or more friends that is logged in to the system, subscribing, by the computing device, the first user to the friend's information and subscribing each friend to the first user's information;
    facilitating, by the computing device, the first user in sending a friend invitation to one of the second users or the third user; and
    in response to sending the friend invitation, removing, by the computing device, the invited second user or third user from the list of second users that the first user never wants to be friend with.

2. A method as recited in claim 1, further comprising:
    identifying, based on an identifier associated with the first user, which of a plurality of presence servers to load the persistent data to.

3. A method as recited in claim 2, wherein the identifier comprises a 64-bit user identifier.

4. A method as recited in claim 2, wherein the identifier is based at least in part on a game title identifier.

5. A method as recited in claim 2, wherein the identifier is based at least in part on a game manufacturer identifier.

6. A method as recited in claim 1, wherein the identifier comprises a 64-bit user identifier.

7. A method as recited in claim 1, wherein the identifier is based at least in part on a game title identifier.

8. A method as recited in claim 1, wherein the identifier is based at least in part on a game manufacturer identifier.

9. A method as recited in claim 1, wherein the persistent data includes a list of one or more other users that are friends of the first user.

10. A method as recited in claim 1, wherein the persistent data includes a list of one or more other users that the first user has requested to mute.

11. A method as recited in claim 1, further comprising:
    establishing user information regarding the current login session of the first user.

12. A method as recited in claim 11, wherein the information regarding the current login session of the first user comprises a game title currently being played by the first user.

13. A method as recited in claim 11, wherein the information regarding the current login session of the first user comprises a fully qualified address of the first user.

14. A method as recited in claim 11, wherein the information regarding the current login session of the first user comprises security information a game session being played by the first user.

15. A method as recited in claim 11, wherein the information regarding the current login session of the first user comprises a current status of the first user.

16. The method of claim 1, further comprising allowing the first user to temporarily mute another user.

17. A system comprising:
    a plurality of notification servers; and
    a processor, the processor executing a plurality of programming instructions that perform the following operations:
    loading, to one of the plurality of notification servers and when a first user logs in to a system, persistent data for the user from a profile store;
    identifying, from the persistent data, one or more friends of the first user, the persistent data including both a list of second users that the first user never wants to be friends with and a list of one or more other users that the first user has requested to mute;
    facilitating the first user in adding a third user to the list;
    receiving a friend invitation from the third user;
    sending to the third user a response message to the friend invitation without notifying the first user of receipt of the friend invitation and without notifying the first user of the response message, the response message indicating that the first user has rejected the friend invitation;

checking whether each of the one or more friends is logged in to the system;

for each of the one or more friends that is logged in to the system, subscribing the first user to the friend's information and subscribing each friend to the first user's information;

facilitating the first user in sending a friend invitation to one of the second users or the third user; and in response to sending the friend invitation, removing the invited second user or third user from the list of second users that the first user never wants to be friends with.

18. A system as recited in claim 17, wherein the instructions, when executed by the processor further perform operations including:

loading, when the first user logs in to the system, a list of friends of the first user;

checking whether each of the one or more friends is logged in to the system; and for each of the one or more friends that is logged in to the system, adding the friend to the subscription list and adding the first user to the other subscription list corresponding to the first friend.

19. A method, comprising:

loading, by a computing device, when a first user logs in to a system, persistent data for the user from a profile store;

identifying, by the computing device, from the persistent data, one or more friends of the first user, the persistent data including a list of second users that the first user never wants to be friends with;

facilitating, by the computing device, the first user in adding a third user to the list;

receiving, by the computing device, a friend invitation from the third user;

sending, by the computing device, to the third user a response message to the friend invitation without notifying the first user of receipt of the friend invitation and without notifying the first user of the response message, the response message indicating that the first user has rejected the friend invitation;

checking, by the computing device, whether each of the one or more friends is logged in to the system;

for each of the one or more friends that is logged in to the system, subscribing, by the computing device, the first user to the friend's information and subscribing each friend to the first user's information;

establishing, by the computing device, at least one notification queue for the user;

checking, by the computing device, whether any information in the profile store is to be added to the at least one notification queue; and adding, by the computing device, based on the checking, information to the at least one notification queue;

establishing, by the computing device, user information regarding the current login session of the first user;

facilitating, by the computing device, the first user in sending a friend invitation to one of the second users or the third user; and in response to sending the friend invitation, removing, by the computing device, the invited second user or third user from the list of second users that the first user never wants to be friends with.

* * * * *